(12) United States Patent
Choi et al.

(10) Patent No.: US 10,111,262 B2
(45) Date of Patent: Oct. 23, 2018

(54) CHANNEL STRUCTURE FOR DISCOVERING TERMINAL IN WIRELESS COMMUNICATION SYSTEM, AND POWER CONTROL METHOD AND APPARATUS

(71) Applicants: Samsung Electronics Co., Ltd., Gyeonggi-do (KR); Research & Business Foundation Sungkyunkwan University, Gyeonggi-do (KR)

(72) Inventors: Hyung-Jin Choi, Seoul (KR); Hyun-Seok Ryu, Gyeonggi-do (KR); Dae-Gyun Kim, Gyeonggi-do (KR); Seung-Hoon Park, Seoul (KR); Dong-Joon Lee, Gyeonggi-do (KR); Won-Joon Hwang, Gyeonggi-do (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

(*) Notice: Subject to any disclaimer, the term of this patent is extended or adjusted under 35 U.S.C. 154(b) by 10 days.

(21) Appl. No.: 15/118,094

(22) PCT Filed: Feb. 10, 2015

(86) PCT No.: PCT/KR2015/001322
§ 371 (c)(1),
(2) Date: Aug. 10, 2016

(87) PCT Pub. No.: WO2015/119476
PCT Pub. Date: Aug. 13, 2015

(65) Prior Publication Data
US 2016/0353500 A1 Dec. 1, 2016

(30) Foreign Application Priority Data
Feb. 10, 2014 (KR) .................. 10-2014-0014853

(51) Int. Cl.
H04W 76/02 (2009.01)
H04L 5/00 (2006.01)
H04W 8/00 (2009.01)
(Continued)

(52) U.S. Cl.
CPC ......... *H04W 76/023* (2013.01); *H04L 5/0053* (2013.01); *H04W 8/005* (2013.01);
(Continued)

(58) Field of Classification Search
None
See application file for complete search history.

(56) References Cited

U.S. PATENT DOCUMENTS

| 8,520,650 B2 | 8/2013 | Esteves et al. |
| 2013/0010618 A1 | 1/2013 | Wang et al. |

(Continued)

FOREIGN PATENT DOCUMENTS

| WO | WO 2013/032551 A1 | 3/2013 |
| WO | WO 2013/062351 A1 | 5/2013 |

(Continued)

OTHER PUBLICATIONS

International Search Report dated Apr. 24, 2015 in connection with International Application No. PCT/KR2015/001322; 5 pages.
(Continued)

*Primary Examiner* — Kouroush Mohebbi

(57) ABSTRACT

The present disclosure provides a method for performing a cellular communication in a device-to-device communication system, the method comprising the operations of: receiving scheduling to transmit an uplink signal through a specific resource of a discovery channel from a base station; generating uplink scheduling information notifying scheduling of the uplink signal; and transmitting the uplink scheduling information through at least one discovery resource of the discovery channel.

22 Claims, 18 Drawing Sheets

(51) Int. Cl.
*H04W 52/38* (2009.01)
*H04W 72/12* (2009.01)
*H04W 76/14* (2018.01)

(52) U.S. Cl.
CPC ..... *H04W 52/383* (2013.01); *H04W 72/1268* (2013.01); *H04W 72/1289* (2013.01); *H04W 76/14* (2018.02)

(56) References Cited

U.S. PATENT DOCUMENTS

| | | |
|---|---|---|
| 2014/0185529 A1 | 7/2014 | Lim et al. |
| 2014/0315562 A1 | 10/2014 | Lim et al. |
| 2015/0003440 A1 | 1/2015 | Lim et al. |
| 2015/0124737 A1 | 5/2015 | Lee et al. |
| 2015/0223141 A1* | 8/2015 | Chatterjee ........... H04W 40/246 370/329 |

FOREIGN PATENT DOCUMENTS

| | | |
|---|---|---|
| WO | WO 2013/081370 A1 | 6/2013 |
| WO | WO 2014/007581 A1 | 1/2014 |

OTHER PUBLICATIONS

Written Opinion of the International Searching Authority dated Apr. 24, 2015 in connection with International Application No. PCT/KR2015/001322, 7 pages.

Qualcomm Incorporated, "Techniques for D2D Discovery", 3GPP TSG-RAN WG1 #73, R1-132503, May 20-24, 2013, Fukuoka, Japan, 7 pages.

Catt, "Multiplexing Between Cellular Link and D2D Link", 3GPP TSG RAN WG1 Meeting #75, San Francisco, California, Nov. 11-15, 2013, 3 pages.

* cited by examiner

CHANNEL STRUCTURE FOR DISCOVERING TERMINAL IN WIRELESS COMMUNICATION SYSTEM, AND POWER CONTROL METHOD AND APPARATUS

CROSS-REFERENCE TO RELATED APPLICATIONS AND CLAIM OF PRIORITY

The present application claims priority under 35 U.S.C. § 365 to International Patent Application No. PCT/KR2015/001322 filed Feb. 10, 2014, entitled "CHANNEL STRUCTURE FOR DISCOVERING TERMINAL IN WIRELESS COMMUNICATION SYSTEM, AND POWER CONTROL METHOD AND APPARATUS", and, through International Patent Application No. PCT/KR2015/001322, to Korean Patent Application No. 10-2014-0014853 filed Feb. 10, 2014, each of which are incorporated herein by reference into the present disclosure as if fully set forth herein.

TECHNICAL FIELD

The present disclosure relates to a structure of a discovery channel for device-to-device communication in a wireless communication system, and further relates to a method and an apparatus for transmitting discovery signals and performing power control.

BACKGROUND ART

Recently, with the emergence of the Internet of things, interest has grown in direct communication between user equipments or in D2D (device-to-device) communication technology, which is a kind of communication method for interworking with smart devices. The D2D communication is a communication scheme in which adjacent devices directly communicate with each other without the relay of an infrastructure of the existing wireless communication systems, such as base stations or APs (Access Points).

In the D2D communication environment, each node including a mobile user equipment discovers other user equipments near the same either independently or through the support of the base station, and establishes a communication session with the discovered user equipment in order to thereby transmit and receive traffic. Since the D2D communication can solve the traffic overload problem by distributing the traffic that is concentrated on the base station, and can provide new communication services based on the proximity between user equipments, it has been highlighted as an element technique for next generation mobile communication technology following 4G.

DETAILED DESCRIPTION OF THE INVENTION

Technical Problem

According to the trend described above, standardization organizations, such as 3GPP (3rd Generation Partnership Project) or IEEE, are processing D2D communication standardization based on LTE (Long Term Evolution)-advanced or a wireless LAN (Wi-Fi) system. 3GPP has named the D2D communication scheme the "ProSe (proximity service)" as an element technique of an LTE release-12 system, and a discussion about the standardization of a physical layer and a wireless interface for the ProSe is in progress through a TSG RAN1 standard meeting. Among them, the standardization of a 3GPP ProSe system is in progress such that each user equipment "discovers" other user equipments near the same and performs direct "communication" with the discovered nearby user equipments. In particular, a discussion about a channel structure for the discovery of the user equipment, a method for allocating resources thereof, and a method for determining the time for transmitting discovery signals has recently been made.

In the ProSe system, the user equipment transmits and receives "discovery signals" to and from other user equipments in order to discover other user equipments through the D2D communication. At this time, the user equipment may obtain a wireless resource through competition with other user equipments in a predefined discovery channel in the uplink band, or may obtain a wireless resource that is scheduled to the corresponding user equipment by the base station.

The user equipment may transmit its own discovery signal by using the wireless resource that has been obtained in the manner above. In addition, the user equipment may receive discovery signals that are transmitted from other user equipments near the user equipment at a time other than the time when the user equipment transmits the discovery signal, and may identify other user equipments that are located near the user equipment by using ID information of the user equipment that is contained in the received discovery signal.

The embodiment of the present disclosure provides a method and an apparatus in which the user equipment that is able to perform the D2D communication in the cellular communication system configures a discovery signal for transmitting or obtaining PUCCH scheduling information.

The embodiment of the present disclosure provides a method and an apparatus in which the user equipment that is able to perform the D2D communication in the cellular communication system determines transmission power based on PUCCH scheduling information obtained from a discovery signal.

The embodiment of the present disclosure provides a method and an apparatus for reducing the interference of the base station, which is generated due to the difference of the transmission power between the PUCCH signal and the discovery signal, and for minimizing the reception performance of the discovery signal when the user equipment that is able to perform the D2D communication in the cellular communication system performs discovery.

Technical Solution

A method for performing cellular communication in a device-to-device communication system, which is provided in the embodiment of the present disclosure, may include: receiving a scheduling, from a base station, to transmit an uplink signal through a specific resource of a discovery channel; generating uplink scheduling information to notify of the scheduling of the uplink signal; and transmitting the uplink scheduling information through one or more discovery resources of the discovery channel.

The uplink scheduling information may be transmitted by using one or more of the discovery resources that are mapped with the specific resource through which the uplink signal is transmitted. Meanwhile, in the uplink scheduling information, one discovery resource, which is mapped with the specific resource, may be mapped with a plurality of specific resources in duplicate.

In the uplink scheduling information, one or more discovery resources, through which the uplink scheduling information is transmitted, may be configured in consideration of a scheduling period of the uplink signal.

The uplink scheduling information may use a reference signal, and at this time, the discovery resource may be a symbol.

The uplink scheduling information may be transmitted by using the discovery resource that is positioned in the central portion of the discovery channel, and at this time, the discovery resource may be a resource block.

The uplink scheduling information may be transmitted through the discovery resource that is positioned in the subframe just before the subframe in which the scheduled uplink signal is to be transmitted.

The uplink scheduling information may contain position information about the specific resource through which the uplink signal is transmitted.

A method for controlling the power of a discovery signal in a device-to-device communication system, which is provided by the present disclosure, may include: receiving uplink scheduling information notifying that an uplink signal has been scheduled through a specific resource of a discovery channel; and performing power control with respect to the discovery signal that is transmitted in the subframe that has been scheduled with the uplink signal according to the uplink scheduling information, wherein the power control is not performed with respect to the discovery signal that is transmitted in the subframe that has not been scheduled with the uplink signal.

The power control may not be performed with respect to the discovery signal that is transmitted in the first subframe of the discovery channel.

In the performing of the power control, if the discovery resource, through which the discovery signal is transmitted in the subframe that has been scheduled with the uplink signal, is within a predetermined range from the central portion of the entire discovery channel, the power control is not performed.

Meanwhile, an apparatus for performing cellular communication in a device-to-device communication system, which is provided by the embodiment of the present disclosure, may include: a transmitting/receiving unit that receives a scheduling, from a base station, to transmit an uplink signal through a specific resource of a discovery channel; and a discovery signal generating unit that generates uplink scheduling information to notify of the scheduling of the uplink signal, and transmits the uplink scheduling information through one or more discovery resources of the discovery channel.

In addition, a user equipment device for controlling the power of a discovery signal in a device-to-device communication system, which is provided by the embodiment of the present disclosure, may include: a transmitting/receiving unit that receives uplink scheduling information notifying that an uplink signal has been scheduled through a specific resource of a discovery channel; and a power control unit that performs power control with respect to the discovery signal that is transmitted in the subframe that has been scheduled with the uplink signal according to the uplink scheduling information, wherein the power control unit does not perform the power control with respect to the discovery signal that is transmitted in the subframe that has not been scheduled with the uplink signal.

MODE FOR CARRYING OUT THE INVENTION

Figure 1:
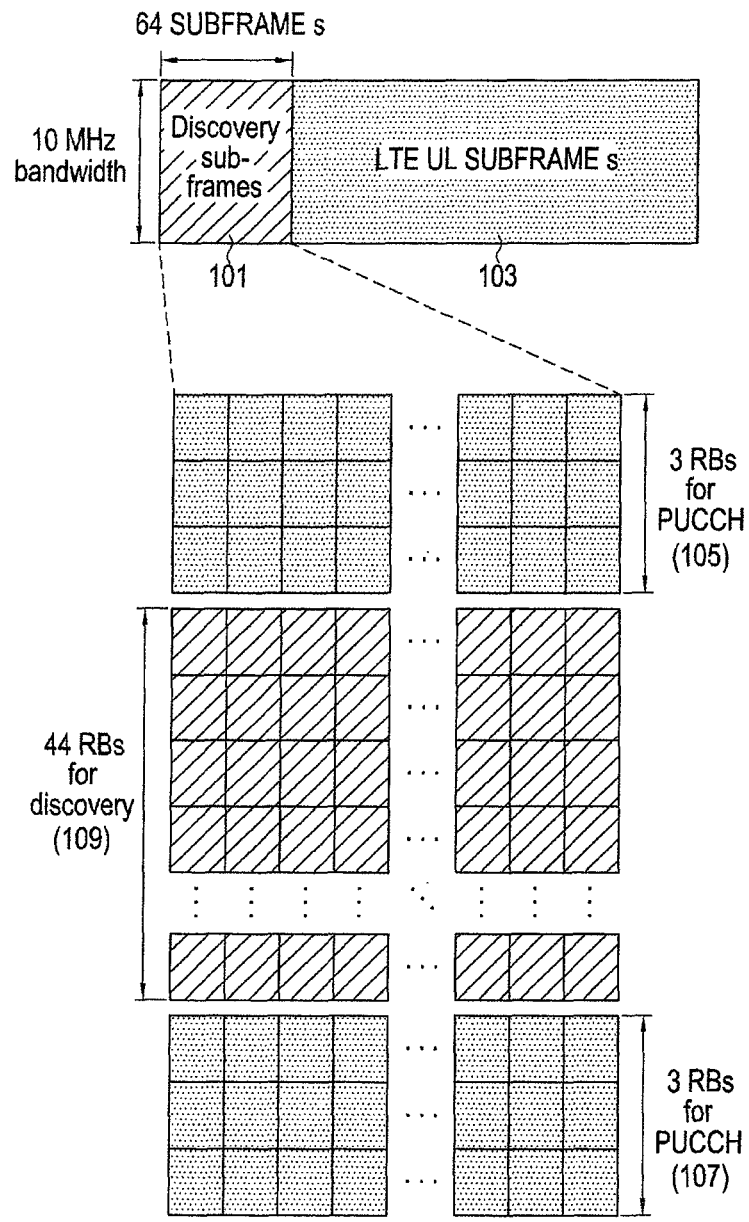
FIG. 1 is a view to explain an example of a discovery channel for D2D communication in the LTE communication system.

Hereinafter, operation principles of exemplary embodiments of the present disclosure will be described in detail with reference to accompanying drawings. Like reference numerals designate like components in the drawings where possible even though components are shown in different drawings. In the following description of the present disclosure, a detailed description of related known functions or configurations will be omitted so as not to obscure the subject of the present disclosure. The terms as described below are defined in consideration of the functions in the embodiments, and the meaning of the terms may vary according to the intention of a user or operator, convention, or the like. Therefore, the definitions of the terms should be made based on the contents throughout the specification.

The embodiment of the present disclosure will be described below based on the 3GPP LTE-based ProSe system. However, this is only intended for the convenience of explanation, and the embodiment of the present disclosure is not limited to the ProSe system and may be applied to the D2D communication.

The main terms used hereinafter will be described prior to the description of the present disclosure.

"D2D user equipment (DUE)" refers to a user equipment that includes a D2D communication function in the state in which the PUCCH signal has not been scheduled in the PUCCH resource region in the discovery channel. That is, it means a user equipment that performs only the D2D communication.

"Cellular user equipment (CUE)" refers to a user equipment that includes a D2D communication function in the state in which the PUCCH signal has been scheduled in the PUCCH resource region in the discovery channel. That is, it means a user equipment that performs both the D2D communication and the cellular communication. This is a comparative term with respect to the D2D user equipment.

The basic concept of the embodiments of the present disclosure is to allow the user equipment to: distinguish between a subframe to which the cellular PUCCH signal has been allocated and a subframe to which the cellular PUCCH signal has not been allocated in a discovery channel in which the D2D communication is available in the cellular communication system; perform power control in the subframe to which the PUCCH signal has been allocated; and not perform power control in the subframe to which the PUCCH signal has not been allocated. Thus, since unnecessary power control is not performed with respect to discovery signals that are transmitted and received through a discovery resource that is in the position where it does not interfere with the base station, it is possible to prevent the discovery performance from being lowered with respect to the discovery signal.

The interference that influences the base station, which is caused by the discovery channel and the discovery signal in the ProSe system, will be described prior to the description of the embodiment of the present disclosure.

In the ProSe system, the user equipment may discover whether or not there are other user equipments near the corresponding user equipment based on the distributed operation between the user equipments or based on the support of the base station in order to perform the D2D communication, and if a nearby user equipment is discovered, the user equipment may perform the D2D communication. Here, the user equipment may discover the nearby user equipments by competitively occupying wireless resources in the predefined discovery channel region or by using wireless resources that are scheduled to the corresponding user equipment by the base station.

FIG. 1 is a view to explain an example of a discovery channel for the D2D communication in the LTE communication system.

The discovery channel 101 for the D2D user equipment discovery is configured with a structure that is separated from a cellular PUSCH (Physical Uplink Shared Channel) signal section 103 by means of a time division multiplexing (TDM) scheme for transmitting separate discovery signals by using a plurality of consecutive subframes.

Here, upper and lower portions 105 and 107 of the band in the discovery channel 101 are defined as "PUCCH resource regions" in order for the user equipment to transmit a cellular control signal to the base station through the discovery channel 101 even though the user equipment performs the D2D communication. Although the size of the PUCCH resource region is not clearly defined at present, it is generally considered that three RBs (Resource Blocks) are used in each of the upper and lower bands for each subframe. In addition, it is considered that the PUCCH signal can hop by one RB in a slot unit. Meanwhile, the remaining region 109, except for the PUCCH resource regions in the discovery channel 101, is a "discovery resource region" for discovering the D2D user equipments, and discovery signals of the user equipments are allocated to a predetermined number of RBs in the discovery resource region to then be transmitted.

The operating method of the PUCCH signal in the discovery channel, which is currently considered, will be described as follows.

In relation to a resource for transmitting the PUCCH signal, it is common to allocate an RB resource for transmitting the PUCCH signal to the user equipment by the scheduling of the base station. That is, the resource is allocated by the scheduling of the base station.

With regard to the transmission time of the PUCCH signal, the time when the timing advance (TA) is applied may be considered as the transmission time of the PUCCH signal according to the distance difference between the base station and the user equipment only for the RRC_CONNECTED user equipment in order to maintain the orthogonality in the base station.

With regard to the transmission power of the PUCCH signal, the open-loop power control is executed, which controls the transmission power of the user equipment signal in consideration of the amount of reduction in the downlink power received from the base station, with respect to the PUCCH signal. This is a power control method that is defined in the LTE uplink in order to ensure the same reception power of the base station from all of the user equipments in the cell.

Meanwhile, the operating method of the discovery signal, which is currently considered, is as follows.

Basically, the method in which each user equipment randomly selects the discovery resource is considered in relation to the discovery resource necessary for the transmission of the discovery signal by the user equipment. In other words, this is a user equipment scheduling scheme. However, various methods, such as a method for adaptively selecting the discovery resource, may be considered depending on the discovery environment of the user equipment, as well as the random method.

In relation to the time when the user equipment transmits the discovery signal, the representative method may be considered, in which the discovery signal is transmitted based on the downlink reception time of the base station in order to configure the same transmission time of the discovery signal for the RRC_CONNECTED user equipment and the RRC_IDLE user equipment.

With regard to the transmission power for the user equipment to transmit the discovery signal, it is generally considered that the discovery signal is always transmitted with a maximum power without a separate power control process in order to ensure a sufficient discovery distance for the discovery signal.

Figure 2:
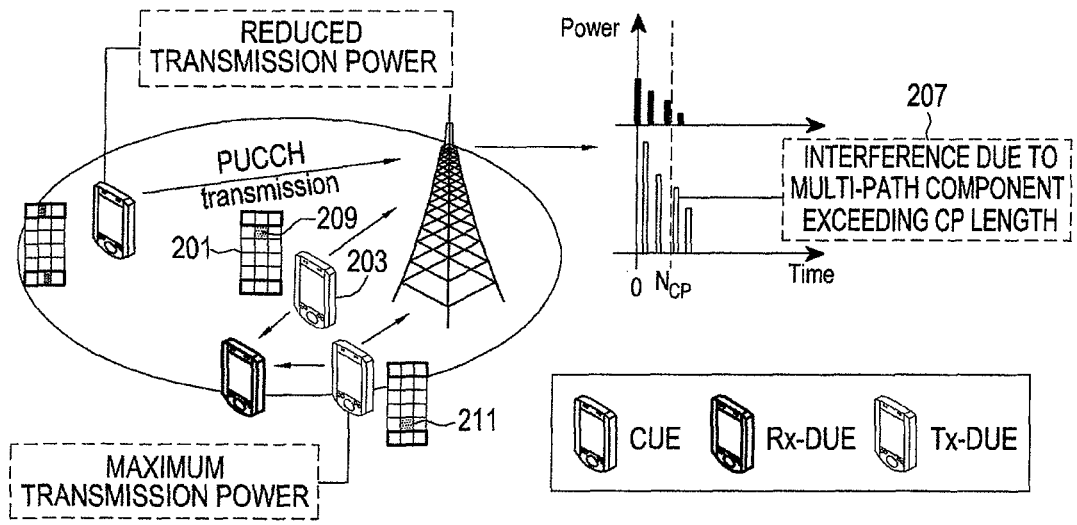
FIG. 2 is a view to explain that interference may occur in a base station when a user equipment transmits a PUCCH signal and a discovery signal with different powers at different times in the discovery channel.

FIG. 2 is a view to explain that interference may occur in the base station when the user equipment transmits the PUCCH signal and the discovery signal with different powers at different times in the discovery channel.

In order to transmit the PUCCH signal and the discovery signal in the existing discovery channel, the signals transmitted by the user equipment have a different transmission time and different transmission powers in the same subframe depending on the type of signal. According to the method above, in the case where a D2D user equipment (DUE) near the base station transmits a discovery signal, the reception power of the discovery signal is much greater than the reception power of the PUCCH signal when the base station receives the discovery signal transmitted by the corresponding user equipment.

For reference, as defined above, the "D2D user equipment (DUE)" refers to a user equipment that includes a D2D communication function in the state in which the PUCCH signal has not been scheduled in the PUCCH resource region in the discovery channel. That is, it denotes a user equipment that performs only the D2D communication. The "cellular user equipment (CUE)", as a comparative term with respect to the same, refers to a user equipment that includes a D2D communication function in the state in which the PUCCH signal has been scheduled in the PUCCH resource region in the discovery channel. That is, it denotes a user equipment that performs both the D2D communication and the cellular communication.

In this case, discovery signals transmitted by the D2D user equipments 203 and 205 may be received by the base station with a high power in the state in which the orthogonality of some components thereof is broken, which exceed the protective section length in the subframe of the base station among the multi-path components of the discovery signals. This may cause a very large ICI (Inter-Channel Interference) 207, which significantly deteriorates the PUCCH signal reception performance of the base station. In particular, when the D2D user equipments 203 and 205 that use the discovery resources 209 and 211 close to the position of the PUCCH resource region on the frequency axis transmit discovery signals from the location near the base station, a relatively larger interference may be caused.

Figure 3:
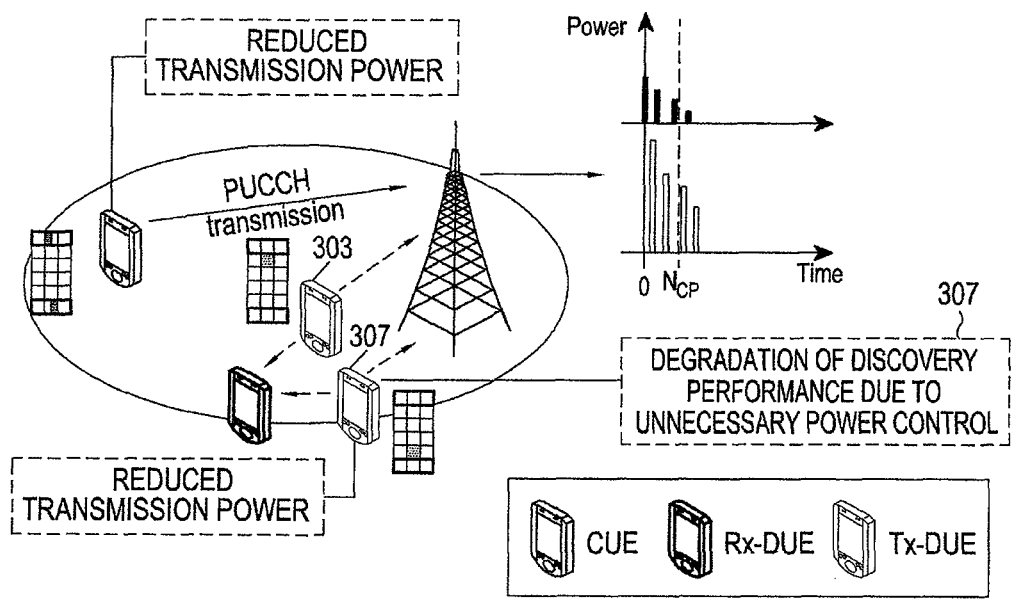
FIG. 3 is a view to explain a problem that may be caused by the measures to solve the problem described in FIG. 2.

FIG. 3 is a view to explain a problem that may be caused by the measures to solve the problem described in FIG. 2.

In order to solve the problem that the discovery signal transmitted by the user equipment described in FIG. 2 interferes with the PUCCH signal received by the base station, the power control may be considered when user equipments 303 and 305 transmit discovery signals as shown in FIG. 3. According to this, since the transmission power of the discovery signal transmitted by the D2D user equipment near the base station is reduced through the power control, the interference with the base station caused by the discovery signal may be minimized.

However, the power control executed in transmitting the discovery signal may reduce the transmission power of the discovery signal of the user equipment near the base station so that the discovery radius of the user equipment may decrease. In addition, considering that the ICI between the PUCCH signal and the discovery signal only occurs in the subframe that is scheduled with the PUCCH signal, if the power control is applied to the discovery signal transmitted in the subframe that is not scheduled with the PUCCH signal, the transmission power of the discovery signal that is allocated to the subframe, in which the PUCCH signal is not transmitted, is unnecessarily reduced. Therefore, when the power control is executed for the transmission of the signal discovery, the transmission power of the discovery signal that does not interfere with the base station may be reduced so that the discovery performance of the discovery signal may be degraded.

A brief summary of the description of FIGS. 2 and 3 above is as follows.

In the case where the PUCCH signal and the discovery signal are transmitted in the discovery channel, since the power control is not executed with respect to the discovery signal to be transmitted and received between the user equipments, there may be interference with the PUCCH signal to be received by the base station. If the power control is executed with respect to all of the discovery signals in order to overcome the problem above, the discovery radius of the discovery signal may be reduced and the power control may also be applied to the discovery signal that does not interfere with the PUCCH signal.

The embodiments of the present disclosure propose a method for minimizing the interference of the discovery signal with respect to the PUCCH signal received by the base station while minimizing the reduction in the discovery performance of the discovery signal transmitted by the D2D user equipment.

To this end, in the embodiment of the present disclosure, in order for the user equipments in the cell to recognize the subframe in which the PUCCH signal is scheduled in the discovery channel, the CUE that has been scheduled with the PUCCH signal transmits "PUCCH scheduling information" through a discovery resource in order to inform the neighboring user equipments of the PUCCH scheduling. The neighboring user equipments that have received the PUCCH scheduling information perform the power control in the subframe in which the PUCCH has been scheduled, and do not perform the power control in the subframe in which the PUCCH has not been scheduled. However, although the PUCCH signal is merely described as an example of an uplink signal in the following description, the present disclosure is not limited thereto. Therefore, the "PUCCH scheduling information" will be described as an example of the information indicating that the uplink signal is to be scheduled or is to be transmitted to the base station.

Hereinafter, the embodiments of the present disclosure will be described in detail.

The embodiment of the present disclosure will describe a structure of a discovery channel in which the cellular user equipments (CUEs) use some of the discovery resources as resources for transmitting the PUCCH scheduling information (PSI) in order to transfer their own PSI to other user equipments in the discovery channel region.

In addition, the embodiment of the present disclosure will describe a method in which each user equipment obtains the PSI based on the proposed discovery channel structure.

In addition, the embodiment of the present disclosure will describe a method in which each user equipment determines the transmission power of the discovery signal based on the obtained PSI.

In addition, the embodiment of the present disclosure will describe a method in which each user equipment estimates the distance to the base station through the reception power of the downlink signal received from the base station, and if the user equipment is sufficiently far from the base station, the size of a discovery resource region for performing the power control is adaptively adjusted.

1. Method for Transmitting PSI

The method for allocating or transmitting the PSI, which will be described below, may be implemented based on: a reference signal; a discovery signal dedicated to the CUE; or downlink control information of the base station, and an appropriate method may be selected and applied according to the operating environment of the system. Hereinafter, a structure of the discovery channel, according to each embodiment, will be described below.

<PSI Transmission Based on Reference Signal>

Figure 4:
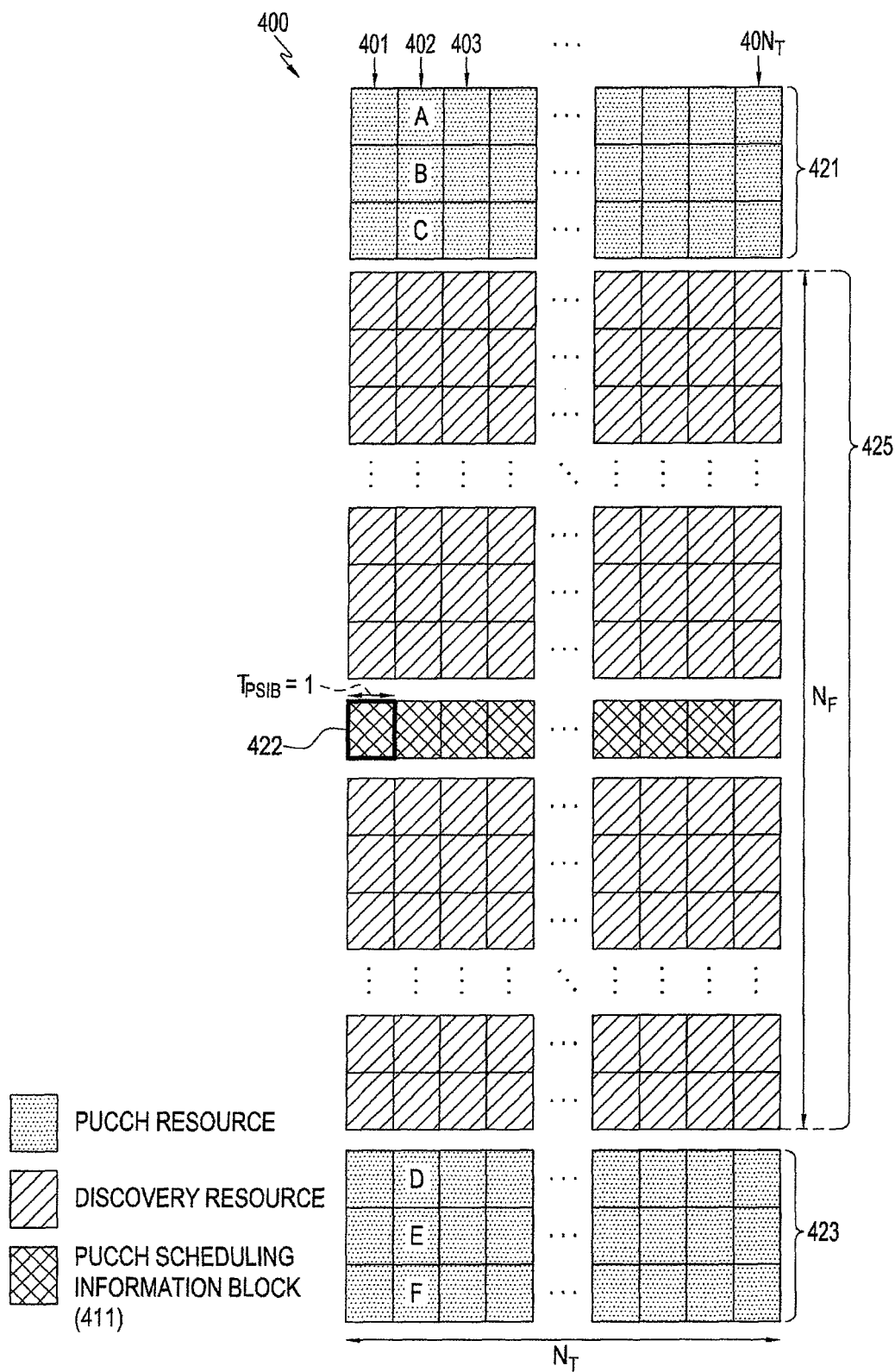
FIG. 4 is a view to explain the structure of a discovery channel 400 that contains a block for transmitting a reference signal for the PSI transmission, according to the first embodiment of the present disclosure.

FIG. 4 is a view to explain a structure of a discovery channel 400 that contains a block for transmitting a reference signal for the PSI transmission, according to the first embodiment of the present disclosure.

Hereinafter, an RB that is positioned in the center of the band of the discovery channel 400 of the user equipment will be defined as a "PUCCH scheduling information resource block (PSI RB)" 411 or a "PSIB".

In the channel structure described above, the CUE that is scheduled to transmit the PUCCH signal in a certain subframe may transmit a reference signal by using one or more OFDM symbols that are mapped with the PUCCH RB allocated to the CUE among a plurality of OFDM symbols in the PSI RB 422 in the subframe 401 that is positioned before the subframe that is scheduled with the PUCCH signal. For reference, one subframe is comprised of fourteen OFDM symbols on the time axis in the LTE system, and a group of twelve subcarriers with respect to one subframe on the frequency axis is referred to as an RB. The example in which the reference signal is mapped with the OFDM symbol in the PSI RB will be described later with reference to FIG. 7. Meanwhile, the mapping relationship between the RB position that is scheduled with the PUCCH signal and the OFDM symbol may be predetermined, and the user equipment may be informed of the same. Therefore, the user equipment that is to transmit the PSI to other user equipments may recognize the position of the OFDM symbol to transmit the reference signal according to the predetermined mapping relationship without a separate scheduling operation by the base station.

Meanwhile, other user equipments that have received the OFDM symbols in the PSI RB and a reference signal in the OFDM symbol may recognize that the PUCCH signal has been scheduled in the PUCCH RB that is positioned to correspond to the position of the corresponding OFDM symbol. Therefore, the user equipment that has transmitted the reference signal to other user equipments through the OFDM symbol corresponding to the mapping relationship may instruct other user equipments to transmit the PUCCH signal by using the PUCCH RB in the position mapped with the OFDM symbol. Thus, at this time, the reference signal may provide the function of the PSI.

For reference, the reference signal may be configured by using a sequence having an excellent correlation property, and the CAZAC (Constant-Amplitude Zero Auto-Correlation) sequence may be used, which is mainly used as an uplink reference signal of the LTE system. At this time, when the user equipment transmits the reference signal in the PSI RB, the user equipment transmits the reference signal with as large a transmission power as possible. This is intended to transfer the accurate PSI to even the user equipments that are quite far away from the current location of the user equipment.

Meanwhile, the discovery channel 400 of FIG. 4 may be variously configured by adjusting the ratio of the PUCCH RBs and to the PSI RBs. At this time, the allocation period of the PSI RB may be determined in consideration of the period in which the PUCCH signal is scheduled. In FIG. 4, it is assumed that the allocation period of the PSI RB is configured to be 1 ($T_{PSIB}$=1).

For example, in the case of an acknowledgement signal (that is, ACK/NACK) for HARQ (Hybrid Automatic Retransmission reQuest) among the information that is transmitted through the PUCCH, the ACK/NACK signal is designed to be transmitted about 4 ms after the reception of a downlink PDSCH (Physical Downlink Shared Channel) signal. Therefore, in the embodiment of the present disclosure, the allocation period of the PSI RB is to be configured to be shorter than 4 ms, and, for example, the maximum value of the allocation period of the PSI RB may be 3 ms.

FIG. 4 shows a structure in which six PUCCH RBs (A to F) that are positioned in one subframe are allocated to one PSI RB in consideration of the description above. At this time, assuming that the entire channel discovery resources are configured by $N_T$ subframes, the total number of PSI RBs is $N_{T-1}$.

In addition, considering an OFDM signal structure that is used in the LTE system, if a normal CP (Cyclic Prefix) is used in the OFDM system, one PSI RB is comprised of fourteen OFDM symbols. At this time, one OFDM symbol may be comprised of twelve subcarriers, and two OFDM symbols may be mapped with one PUCCH RB. That is, the PUCCH RB (A) of the subframe 402 may be mapped with two OFDM symbols among fourteen OFDM symbols in the PIS RB 422 of the subframe 401.

Figure 5:
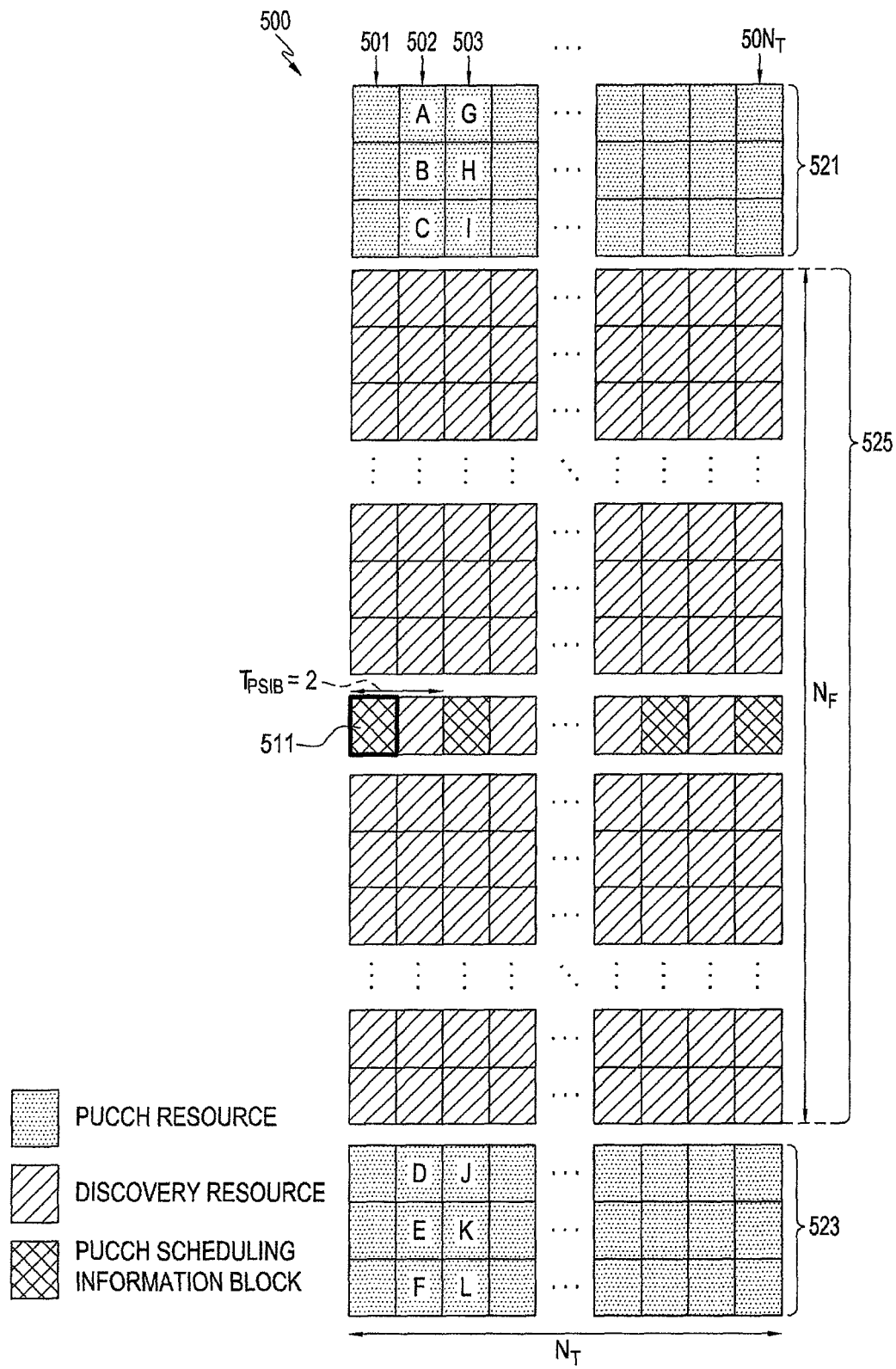
FIG. 5 is a view to explain the structure of a discovery channel 400 that contains a block for transmitting a reference signal for the PSI transmission, according to the second embodiment of the present disclosure.

FIG. 5 is a view to explain a structure of a discovery channel that contains a block for transmitting a reference signal for the PSI transmission, according to the second embodiment of the present disclosure.

FIG. 5 shows an example in which a total of twelve PUCCHs that are positioned in two consecutive subframes are allocated to one PSI RB. That is, twelve PUCCH RBs (A to L) in two subframes 502 and 503 are allocated to one PSI RB 501. At this time, assuming that the entire channel discovery resources are comprised of $N_T$ subframes, the total number of PIS RBs is $N_T/2$. In the allocation structure of the PUCCHs and the PSI RB described above, twelve PUCCH RBs may be mapped, one to one, with twelve symbols among fourteen OFDM symbols contained in the PIS RB 511.

Figure 6:
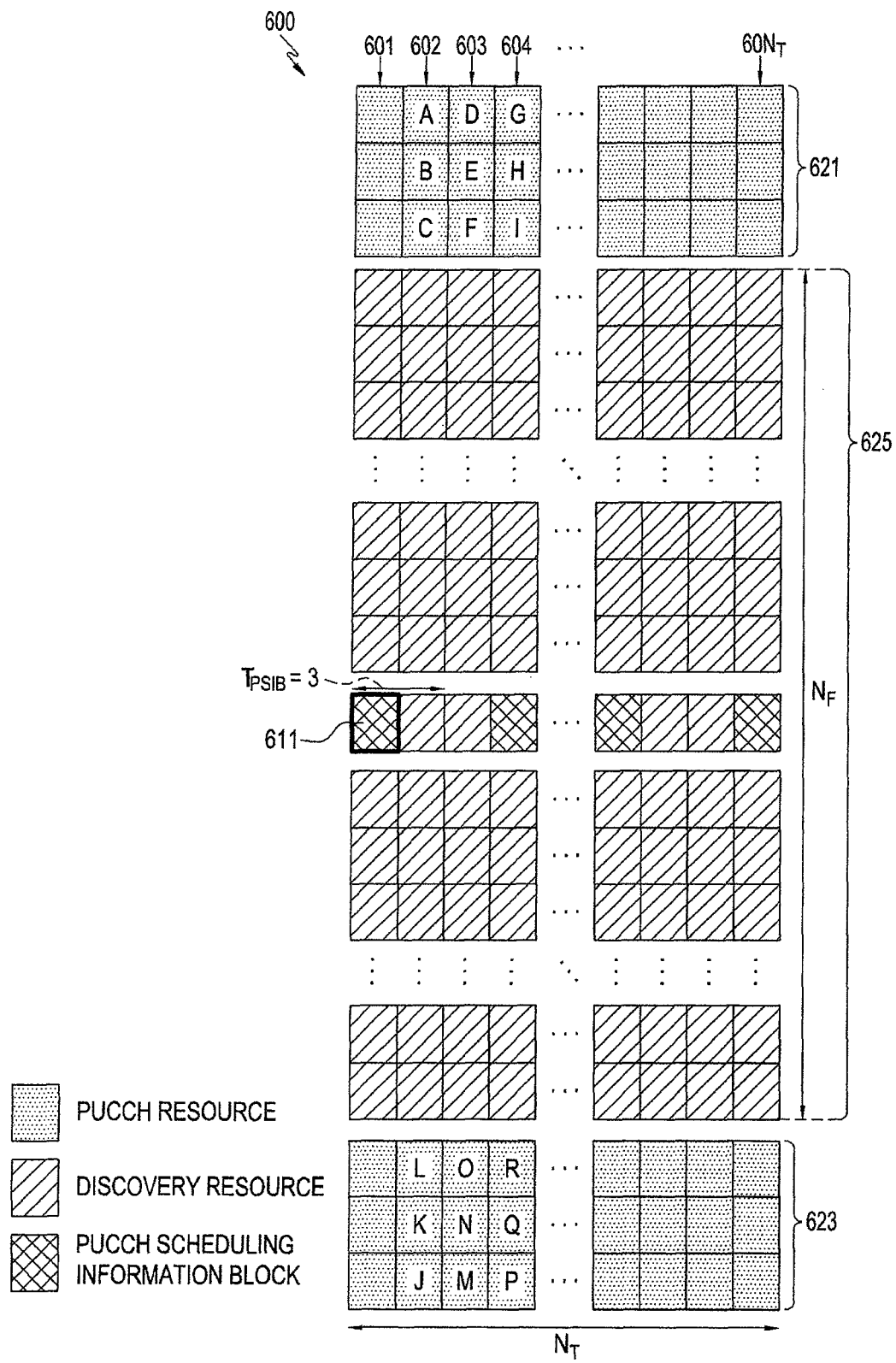
FIG. 6 is a view to explain the structure of a discovery channel 400 that contains a block for transmitting a reference signal for the PSI transmission, according to the third embodiment of the present disclosure.

FIG. 6 is a view to explain the structure of a discovery channel that contains a block for transmitting a reference signal for the PSI transmission, according to the third embodiment of the present disclosure.

FIG. 6 shows an example in which a total of eighteen PUCCHs that are positioned in three consecutive subframes are allocated to one PSI RB. That is, eighteen PUCCHs (A to R) in three subframes 602, 603, and 604 are allocated to one PSI RB 601. At this time, assuming that the entire channel discovery resources are comprised of $N_T$ subframes, the total number of PIS RBs is $N_T/3$. In the allocation structure of the PUCCHs and the PSI RB described above, eighteen PUCCH RBs may be mapped with twelve OFDM symbols in the PIS RB 611. In this case, since the number of PUCCH RBs is greater than the number of OFDM symbols, two RBs that are positioned in the same subframe among eighteen PUCCH RBs may be mapped with one OFDM symbol in duplicate. For example, the PUCCH RBs (A) and (C) may be mapped with the same symbol (e.g., symbol index=1) in the PSI RB 611. In this case, two different user equipments that are scheduled with the PUCCH signal, for example, transmit the reference signals by using the OFDM symbol of the symbol index=1. Other user equipments that receive the reference signals may receive the reference signals that are transmitted by two different user equipments by using the OFDM symbol corresponding to the symbol index=1 in the PSI RB 611. This allows the user equipment, which receives the corresponding reference signal, to receive the same reference signal twice, so it is possible to obtain the transmission diversity effect in order to thereby improve the reliability of the PSI. That is, it does not matter which user equipment transmits the PSI proposed in the present disclosure, and it does not matter which user equipment transmits the PSI for other user equipments, but other user equipments can recognize that the PUCCH signal is to be transmitted through the corresponding PUCCH RB in a specific PUCCH RB (even without recognizing the user equipment that transmits the same).

In addition to the PSI RB allocation method according to the embodiments described above, various modifications can be made, for example, by adjusting the position of the frequency axis of the PSI RB and/or the number of RBs. For example, in FIGS. 4 to 6, the PSI is transmitted in the PSI RB in the subframe just before the subframe that is in the front position among the subframes containing the PUCCH RB that is scheduled with the PUCCH signal. However, according to the configuration, the PSI may be transmitted in the PSI RB contained in the N-th subframe before the subframe that is scheduled with the PUCCH signal. Therefore, configuration information may be set with respect to the discovery channel, which has various PSI RB allocation structures including the embodiments described above, and each base station may select an appropriate configuration in consideration of the number of CUEs positioned in its own cell and may adaptively allocate or utilize the PUCCH RB resources and the PSI RB resource.

Meanwhile, according to embodiments of the present disclosure, when each user equipment transmits and receives the discovery signal, each user equipment may detect the reference signal from the OFDM symbols transmitted in the PSI RB that is positioned just before the subframe that is selected by the user equipment for transmitting the discovery signal in order to thereby recognize that the PUCCH signal has been scheduled in the PUCCH RB corresponding to the position of the OFDM symbol in which the corresponding reference signal is detected.

That is, the user equipment may detect a correlation peak of the reference signals transmitted in the PSI RB, and if the detected peak value is equal to, or more than, a predetermined threshold value, which is distinct from a noise, the user equipment may recognize that the PUCCH signal has been scheduled in the PUCCH RB positioned to correspond to the OFDM symbol in which the corresponding reference signal is transmitted. For reference, as described above, the reference signal in the PSI RB is transmitted with as large a power as possible by the user equipment, and is configured with a sequence having an excellent correlation property. Therefore, even in the environment in which the reception SNR (Signal-to-Noise power Ratio) of the reference signal is relatively low due to the penetration loss of a wall and the path-loss during the signal propagation, relatively accurate PSI may be obtained.

Meanwhile, in order to transmit the PSI, the position of the reference signal may vary in the PSI RB. The user equipment may transmit the reference signal by using the OFDM symbol in the PSI RB corresponding to the position of its own PUCCH RB according to a predefined mapping rule, and the reference signal at this time becomes the PSI.

Figure 7:
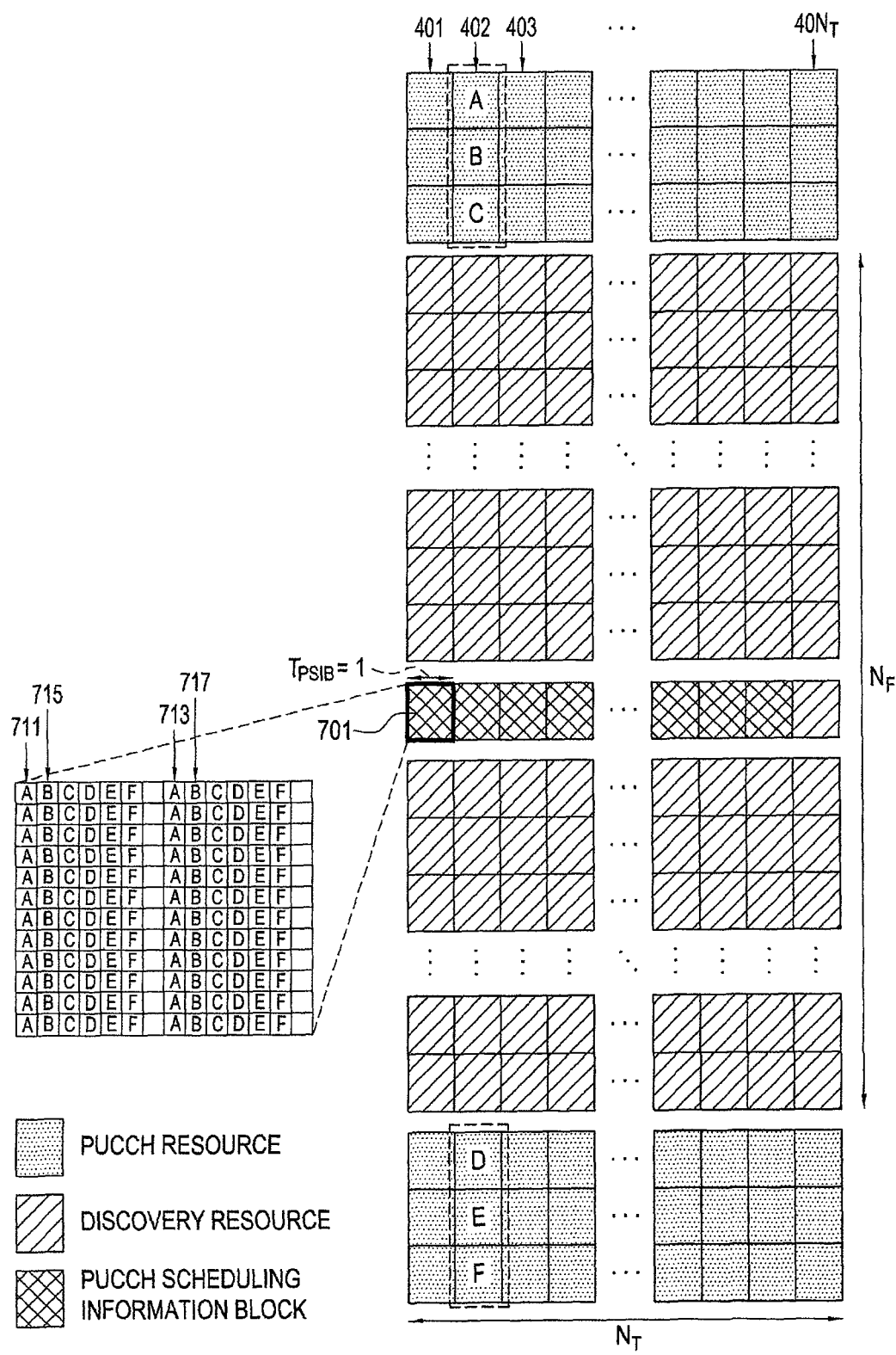
FIG. 7 is a view to explain an example of the mapping between PUCCH RBs and OFDM symbols in a PSI RB for the PSI transmission according to embodiments of the present disclosure.

FIG. 7 is a view to explain an example of the mapping between the PUCCH RB and the OFDM symbols in the PSI RB for transmitting PSIs, according to embodiments of the present disclosure.

The PSI RB allocation structure of FIG. 7 is illustrated based on the first embodiment of FIG. 4, wherein one PUCCH RB in one subframe is mapped with two OFDM symbols in the PSI RB allocated to the corresponding subframe. For example, if the reference signals are transmitted through two symbols 711 and 713 in the PSI RB 701, the reference signals indicate that the PUCCH signal is scheduled in the position of the PUCCH RB "A" in the subframe 402. Likewise, if the reference signals are transmitted through two symbols 715 and 717 in the PSI RB 701, the reference signals indicate that the PUCCH signal is scheduled in the position of the PUCCH RB "B" in the subframe 402. The remaining OFDM symbols in the PSI RB 701 are illustrated to be mapped with the PUCCH RBs according to a predetermined mapping rule.

As described above, since the mapping rule between the position of the PUCCH RB and the symbols in the PSI RB are predefined by the configuration information, the user equipment may know the mapping rule in advance through the configuration information. Therefore, the user equipment may determine the position (or index) of the OFDM symbol for transmitting its own reference signal among the OFDM symbols in the PSI RB without an additional scheduling by the base station. In addition, other user equipments that identify the PSI may recognize the position of the reference signal in advance according to the mapping relationship in order to thereby figure out the position of the PUCCH RB that has been scheduled with the PUCCH signal from the symbol index indicating the position of the OFDM symbol in the PSI RB where the correlation peak value occurs, which is equal to, or more than, a threshold value.

Meanwhile, the mapping rule between the symbol indexes for the reference signals in the PUCCH RB and the PSI RB may be variously modified in addition to the embodiment of FIG. 7. For example, considering the position of the PUCCH RB (the position C or D in FIG. 7) that is most likely to be affected by the interference because it is close to the discovery channel region on the frequency axis, the more OFDM symbols may be allocated to be mapped with the position C or D among the OFDM symbols in the PSI RB. Alternatively, the base station may directly allocate the reference signal symbol index in the PSI RB only in consideration of only the number of user equipments that are actually scheduled with the PUCCH signal.

So far, the structure of the discovery channel for transmitting the PUCCH scheduling information based on the reference signal has been described. Hereinafter, the discovery channel structure based on the discovery signal dedicated to the CUE will be described.

<PSI Transmission Based on CUE-dedicated Discovery Signal>

In the PSI transmission method based on the reference signal described above, a plurality of PUCCH RBs are mapped with the OFDM symbols in one PSI RB. Unlike the method above, in the PSI transmission method based on the CUE-dedicated discovery signal, which will be described below, one or more PUCCH RBs that are scheduled with the PUCCH signal of the CUE are mapped with a discovery resource for transmitting the discovery signal of the CUE.

That is, if the base station schedules a certain user equipment to transmit the PUCCH signal through a specific PUCCH RB, the user equipment becomes the CUE. The CUE transmits a discovery signal by using the CUE-dedicated discovery resource that is mapped with the position of the scheduled PUCCH RB when transmitting the discovery signal. Other user equipments that have received the discovery signal transmitted through the CUE-dedicated discovery resource may recognize that the PUCCH signal has been scheduled in the position of the PUCCH RB corresponding to the position of the discovery resource by which the discovery signal is transmitted. Therefore, the discovery resource is transmitted according to the mapping relationship between the position of the CUE-dedicated discovery resource and the PUCCH RB, which may serve as the PSI to inform that the PUCCH signal has been scheduled through a specific resource.

Figure 8:
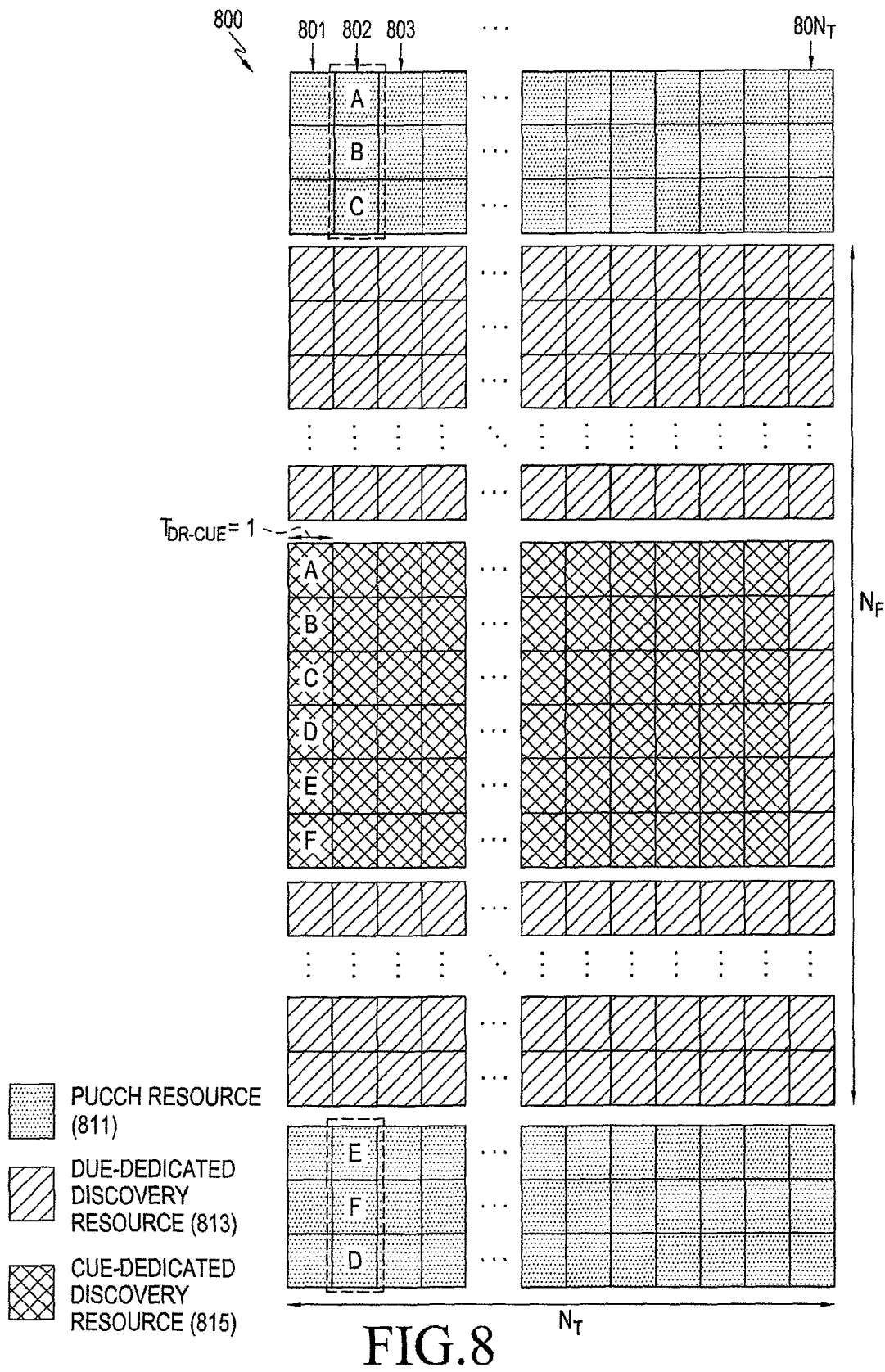
FIG. 8 is a view to explain an example of a discovery channel structure for the PSI transmission based on a discovery signal dedicated to a CUE, according to the fourth embodiment of the present disclosure.

FIG. 8 is a view to explain an example of a discovery channel structure for transmitting the PSI based on the discovery signal dedicated to the CUE, according to the fourth embodiment of the present disclosure.

In FIG. 8, one or more RBs that are positioned in the center of the user equipment discovery channel 800 are allocated as CUE-dedicated discovery resources 815, and the CUE transmits the discovery signal by using the corresponding CUE-dedicated discovery resource 815. For reference, the remaining discovery resources except for the CUE-dedicated discovery resources 815 become DUE-dedicated discovery resources 813 that are used by the DUE to transmit the discovery signal.

In addition, FIG. 8 shows an example in which one PUCCH RB 811 is mapped with one CUE-dedicated discovery resource 815. At this time, if the entire discovery channel 800 is comprised of $N_T$ subframes, the number of subframes that are allocated with the CUE-dedicated discovery signal 815 is $N_{T-1}$ in the entire discovery channel 800. This is due to the assumption in which the discovery signal is transmitted in the subframe prior to the subframe to which the RB scheduled with the PUCCH signal belongs.

Meanwhile, the position of the RB that is used by the CUE for the discovery signal transmission may be predetermined according to the position of the PUCCH signal. For example, FIG. 8 shows that the CUE-dedicated discovery signals are disposed, in sequence, in the CUE-dedicated discovery resources allocated to the subframe 801 that is positioned just before the subframe 802 to correspond to the positions (A to C) of the RBs that are scheduled with the PUCCH signals in the subframe 802. As described above, in the case where the position of the discovery resource RB for the discovery signal transmitted by the CUE is predetermined and the user equipments are notified of the same, the CUE may recognize the position of the RB to transmit its own discovery signal according to the position of the PUCCH RB without a separate scheduling of the base station.

In addition, in order to stably transmit the PSI, the CUE discovery signal may be transmitted with a maximum transmission power without power control in the corresponding user equipment. At this time, even if the CUE discovery signal is transmitted with a maximum transmission power, since the CUE-dedicated discovery resource 811 is positioned in the central portion of the entire discovery channel 800, the interference with the PUCCH signals that are transmitted in both end regions of the entire band 800 is not great.

Meanwhile, like the description of FIG. 4, the allocation period of the CUE-dedicated discovery resource may be limited up to 3 ms, and various configurations may be made by adjusting the ratio of the PUCCH RBs to the CUE-dedicated discovery resources 811.

Figure 9:
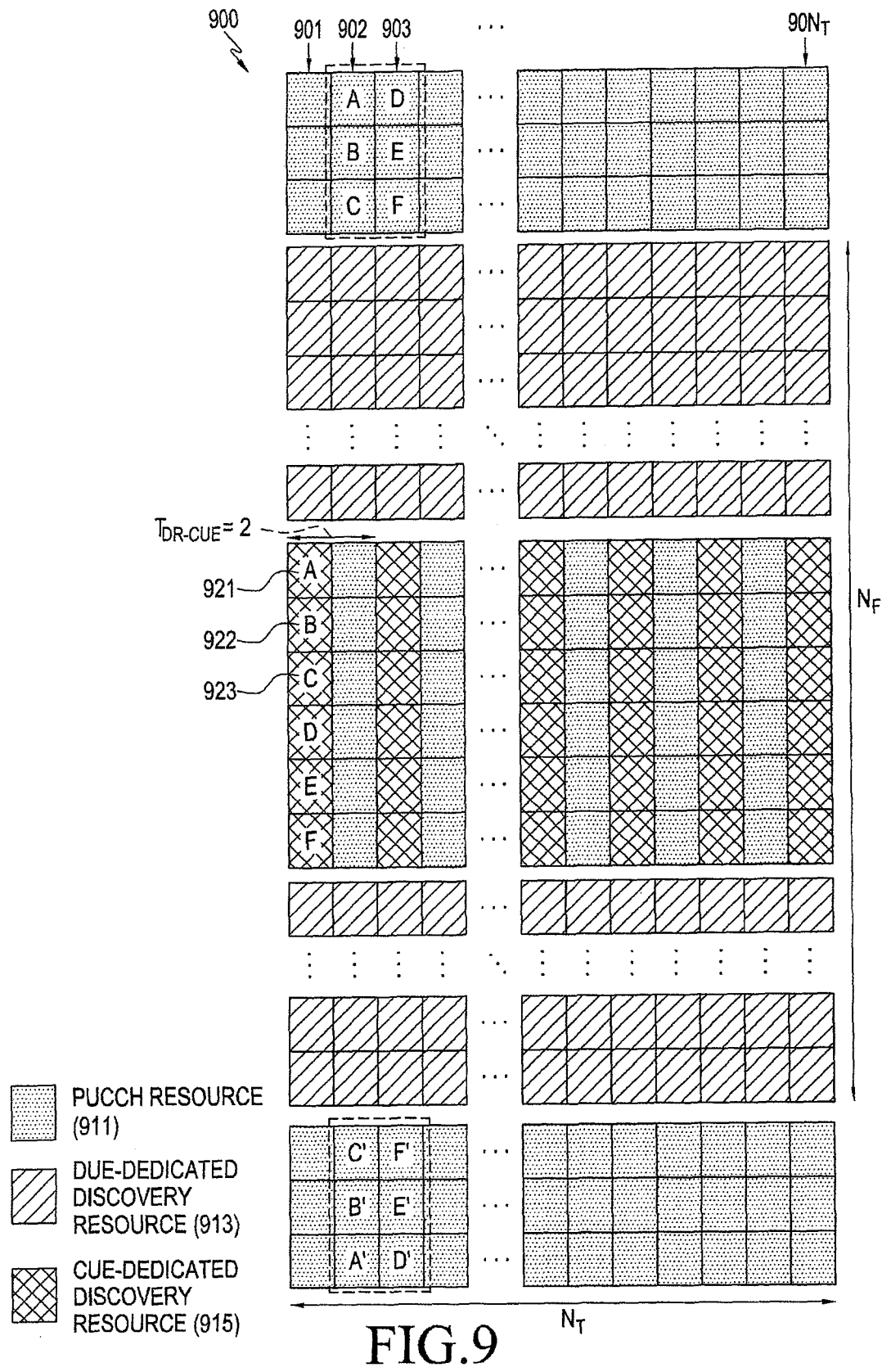
FIG. 9 is a view to explain another example of a discovery channel structure for transmitting PUCCH scheduling information based on a discovery signal dedicated to a CUE, according to the fifth embodiment of the present disclosure.

FIG. 9 is a view to explain another example of a discovery channel structure for transmitting PUCCH scheduling information based on a discovery signal dedicated to CUE, according to the fifth embodiment of the present disclosure.

In FIG. 9, it is assumed that the period $T_{DR-CUE}$ of the subframe for transmitting the discovery signal is configured to be 2. Accordingly, the embodiment assumes that two PUCCH RBs are mapped with one CUE-dedicated discovery resource 915. That is, two different RBs, which are scheduled with the PUCCH signal in the same subframe, are mapped with the same discovery resource RB. At this time, if the entire discovery channel 900 is comprised of $N_T$ subframes, the number of subframes that are allocated with the CUE-dedicated discovery signal is $N_T/2$ in the entire discovery channel 900.

For example, FIG. 9 shows that three PUCCH RBs (A, B, and C) positioned in the upper portion of the subframe RB 902 and the PUCCH RBs (A', B', and C') positioned in the lower portion thereof are mapped in sequence with the CUE-dedicated discovery resources A (921), B (922), and C (923). The user equipments may be informed of the mapping relationship between the PUCCH RBs and the CUE-dedicated discovery resources by predetermined configuration information or by control information, or may be informed of the same through a separate signaling of the base station.

In FIG. 9, if two different PUCCH RBs are scheduled with respect to two different CUEs, even though the CUEs transmit the PUCCH signals by using different PUCCH RBs, respectively, the two CUEs will transmit the discovery signals by using the same CUE-dedicated discovery resource. In this case, the discovery signals may conflict with each other because two CUEs transmit the discovery signals by using the same resource. Therefore, if the number of CUEs in the cell exceeds a specific value, the discovery performance may be degraded. However, even though the discovery signals of different CUEs are duplicated so that other user equipments cannot demodulate the corresponding discovery signal, the PSI may be obtained from the corresponding signal power. That is, if two CUEs allocated with the same discovery resource transmit the discovery signals through the corresponding discovery resource, respectively, two discovery signals may be duplicated. At this time, other user equipments that have received the duplicated discovery signal cannot correctly demodulate the corresponding discovery signal, but can measure the intensity of the power of the duplicated discovery signal. The intensity of the measured power may be greater than a noise. Therefore, other user equipments that have received the duplicated discovery signal may recognize that the PUCCH signal has been scheduled in the position of the PUCCH resource that is mapped with the position of the discovery resource through which the corresponding discovery signal is received. After all, in the case where two user equipments are allocated with the same discovery resource, the discovery signals may be duplicated because two user equipments transmit the discovery signals by using the same discovery resource. However, the user equipments that receive the discovery signals may measure the intensity of the power of the corresponding discovery signal, and if the intensity of the power is equal to, or more than, a predetermined threshold value, may recognize that the PUCCH signal has been scheduled in the position of the PUCCH RB corresponding to the corresponding discovery signal. Therefore, although the discovery signals may be duplicated in the discovery channel structure of FIG. 9, the user equipments that receive the same may know that the PUCCH signal has been scheduled in the PUCCH RB according to the mapping relationship regardless of the occurrence of the duplicated discovery signals in order to thereby obtain the PSI.

Figure 10:
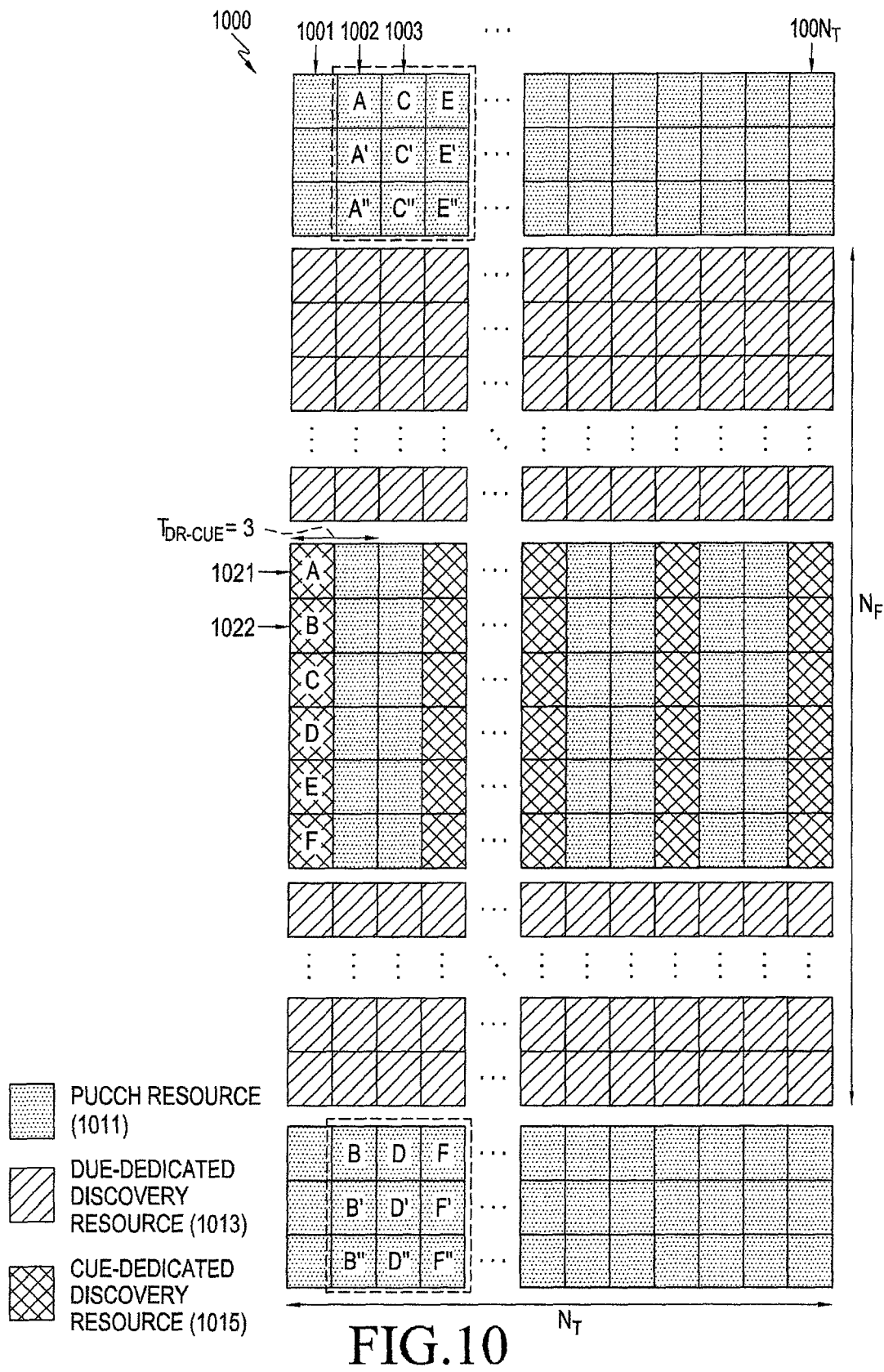
FIG. 10 is a view to explain another example of a discovery channel structure for transmitting PUCCH scheduling information based on a discovery signal dedicated to a CUE, according to the sixth embodiment of the present disclosure.

FIG. 10 is a view to explain another example of a discovery channel structure for transmitting PUCCH scheduling information based on a discovery signal dedicated to the CUE, according to the sixth embodiment of the present disclosure.

In FIG. 10, it is assumed that the period $T_{DR\text{-}CUE}$ of the subframe for transmitting the discovery signals is configured to be 3. Accordingly, the embodiment assumes that three PUCCH RBs are mapped with one CUE-dedicated discovery resource 1015. That is, three different RBs, which are scheduled with the PUCCH signal in the same subframe, are mapped with the same discovery resource RB. At this time, if the entire discovery channel 1000 is comprised of $N_T$ subframes, the number of subframes that are allocated with the CUE-dedicated discovery signal 1015 is $N_T/3$ in the entire discovery channel 1000.

For example, FIG. 10 shows that three PUCCH RBs (A, A', and A") positioned in the upper portion of the subframe 1002 are mapped with the CUE-dedicated discovery resources A (1021) and the PUCCH RBs (B, B', and B") are mapped with the CUE-dedicated discovery resources B (1022) in the same manner. The user equipments may be informed of the mapping relationship between the PUCCH RBs and the discovery resource by predetermined configuration information or by control information, or may be informed of the same through a separate signaling of the base station.

The description of FIG. 9, except for the difference described above, may be applied thereto. That is, although the discovery signals may be duplicated, the user equipments that receive the same may obtain the PUCCH scheduling information regardless of the occurrence of the duplicated discovery signals.

Various configurations may be made according to the mapping rule between the RBs of the CUE-dedicated discovery signal and the PUCCH RBs in addition to the discovery channel structure described in the fourth embodiment to the sixth embodiment. Each base station may select an appropriate configuration in consideration of the number of CUEs positioned in its own cell, and may adaptively allocate the CUE-dedicated discovery resource that the CUE and DUE can use. Like the PSI transmission method based on the reference signal described above, each base station may define the configuration information in consideration of the number of CUEs in the cell in order to thereby adaptively allocate, or utilize, the user equipment discovery resource that the CUE and DUE can use.

The discovery channel structure for transmitting the PUCCH scheduling information based on the user equipment-dedicated discovery signal has been described above. Hereinafter, the discovery channel structure based on downlink control information will be described.

<PSI Transmission Method Based on Downlink Control Information>

The first to third embodiments relate to the discovery channel structure based on the reference signal, and the fourth to sixth embodiments relate to the discovery channel structure based on the user equipment-dedicated discovery signal. The embodiments above relate to the method in which the user equipment independently obtains the PUCCH scheduling information without the support of the base station.

The seventh embodiment of the present disclosure relates to a method in which the PSI is transmitted to the user equipment based on the downlink control information. That is, in the seventh embodiment, the base station directly transmits the PUCCH scheduling information to the user equipments in the cell. For example, the base station may transmit the PSI to the user equipments through an SIB (System Information Block) in a PDCCH (Physical Downlink Control Channel). In the case where the base station directly transmits the PUCCH scheduling information to the user equipments as described above, an increase in the overhead for transmitting the downlink control information is inevitable in the base station, but the operation of the user equipment may be relatively simplified and the reliability of the PUCCH scheduling information transmitted to the user equipments may be improved.

2. Method for Controlling Discovery Signal Power Based on PSI

Hereinafter, a power control method of the discovery signal based on the PUCCH scheduling information will be described.

The DUE that has obtained the PSI through the embodiments described above may perform the open-loop power control while transmitting the discovery signal through the subframe where the RB allocated with the PUCCH signal is positioned in order to thereby minimize the interference with the base station.

In the power control method proposed hereinafter, the power control is performed in the subframe that is allocated with the PUCCH signal, which is likely to interfere with the base station, and the power control is not performed in the subframe that is not allocated with the PUCCH signal in order to thereby minimize the performance degradation of the discovery signal.

In the channel structure described above in the embodiments of the present disclosure, the PUCCH RB in each subframe is mapped with the PSI RB in the subframe that is positioned just before the corresponding subframe. This is intended to transmit the PUCCH scheduling signal in the PSI RB (i.e., the PSI RB) in order to thereby inform that the PUCCH signal is scheduled in the next subframe.

However, since there is no subframe just before the first subframe in the discovery channel, the PSI RB that is mapped with the PUCCH RB allocated to the first subframe does not exist. Therefore, it is impossible to obtain the scheduling information for the PUCCH signal that is allocated to the first subframe. Considering this, in the embodiments of the present disclosure, the power control is performed with respect to all of the discovery signals allocated to the first subframe in order to thereby minimize the interference with the base station.

Figure 11:
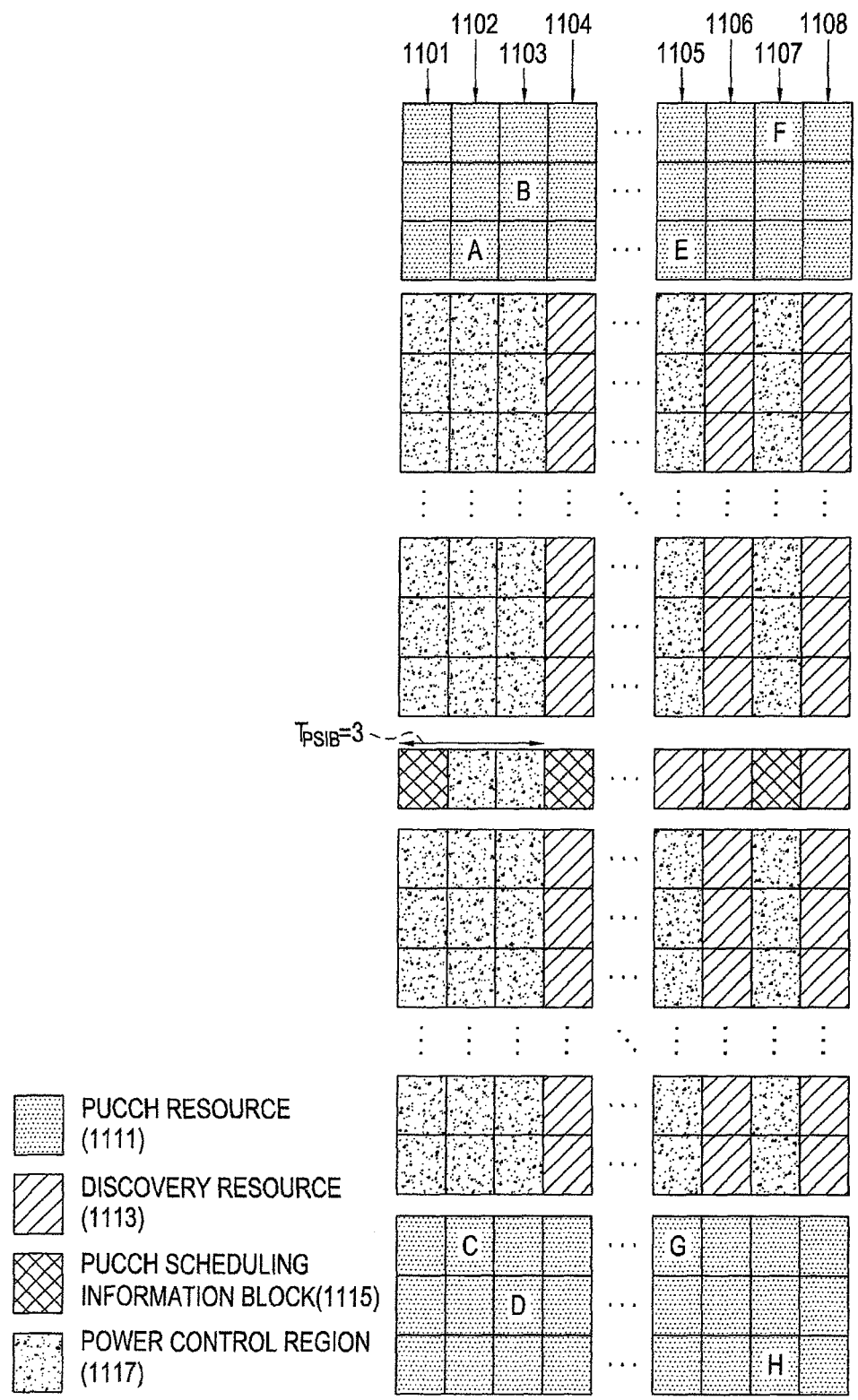
FIG. 11 is a view to explain a power control method of a discovery signal, according to embodiments of the present disclosure.

FIG. 11 is a view to explain a power control method of a discovery signal, according to embodiments of the present disclosure.

FIG. 11 shows a method for transmitting the PSI based on the reference signal, wherein the period of the PSI RB is assumed to be 3.

Referring to FIG. 11, the power control is performed with respect to all of the discovery signals allocated to the first subframe 1101, and the power control is performed in the subframes 1102, 1103, 1105, and 1107 that are scheduled with the PUCCH signal, but the power control is not performed in the subframes 1104, 1106, and 1108 that are not scheduled with the PUCCH signal.

Meanwhile, in the case of a large cell radius, the user equipment that is sufficiently far from the base station hardly interferes with the base station because of the attenuation of the signal power due to the distance difference. In addition, in the case of transmitting the discovery signal by using the discovery resource positioned in the central portion of the entire band, since the frequency interval between the PUCCH resource and the RBs of the central portion of the band for transmitting the discovery signal is large, the interference with the base station is not great. Therefore, the power control may be performed in consideration of the distance between the user equipment and the base station. At this time, it is possible to adjust the size of the discovery signal region for executing the power control in consideration of the distance between the user equipment and the base station.

Figure 12:
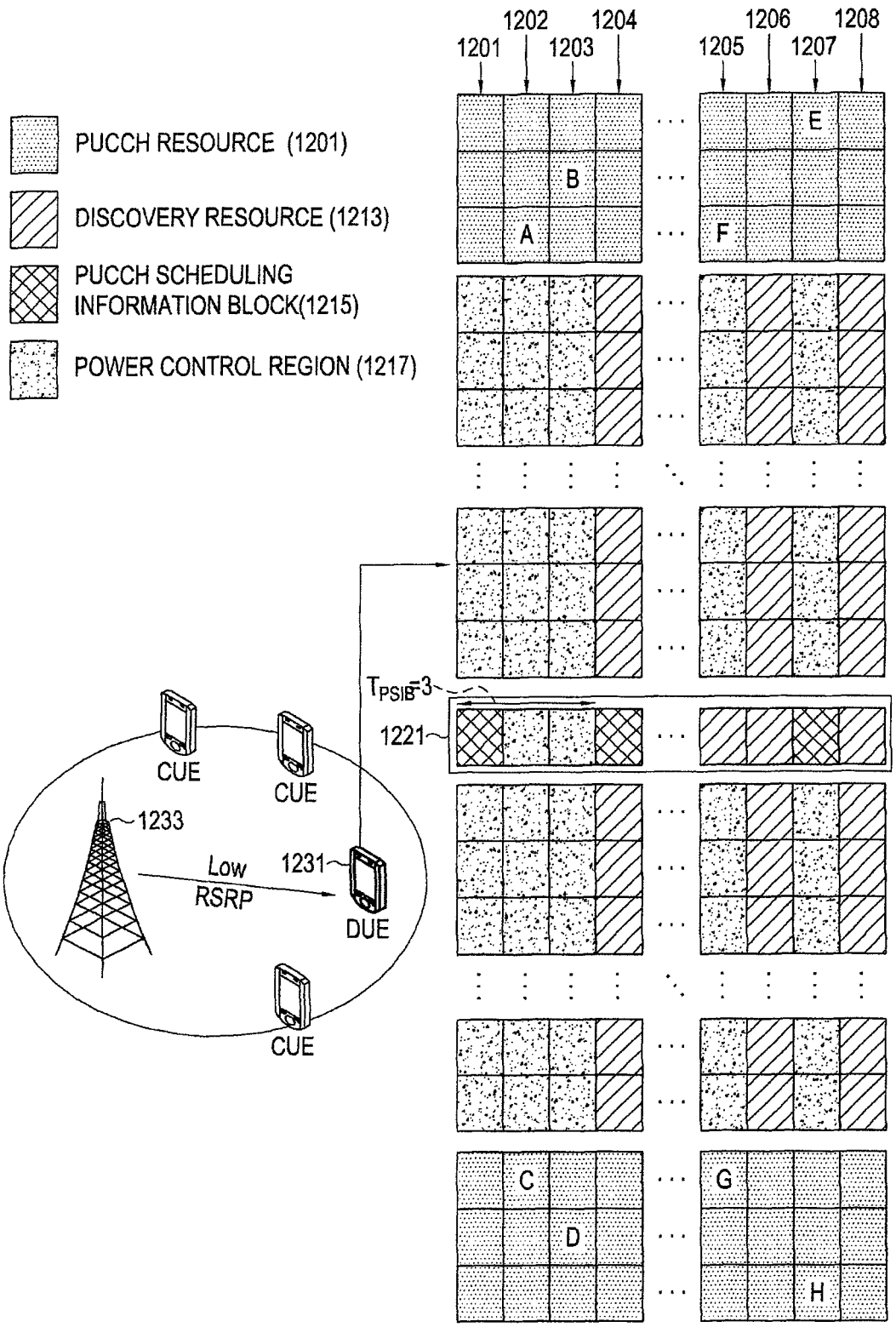
FIG. 12 is a view to explain an example of a power control method of a discovery signal in consideration of the distance between the user equipment and the base station, according to embodiments of the present disclosure.

FIG. 12 is a view to explain an example of a power control method of a discovery signal in consideration of the distance between the user equipment and the base station, according to embodiments of the present disclosure.

FIG. 12 illustrates the power control that is performed in consideration of the distance between the user equipment and the base station in addition to FIG. 11. The user equipment may estimate the distance between the user equipment and the base station in a predetermined manner. For example, the DUE 1231 of FIG. 12 may measure the RSRP (Reference Signal-Received Power) of the primary synchronization signal (PSS) in the downlink in order to thereby estimate the distance between the corresponding user equipment 1231 and the base station 1233 by using the same.

If the user equipment 1231 is sufficiently far away from the base station 1233 as a result of the estimation, or if the distance between the corresponding user equipment and the base station is equal to, or more than, a predetermined reference value and if the corresponding user equipment 1231 transmits the discovery signal by using the discovery resource positioned in the central portion 1221 of the band, the power control is not performed with respect to the discovery signal transmission in the corresponding subframe even though the PUCCH signal is allocated to the same subframe as the subframe in which the discovery signal is transmitted. The PUCCH signal is allocated to the subframe 1207 in FIG. 12. However, since the discovery signal is transmitted through the discovery resource in the central portion of the band of the subframe 1207 in FIG. 12, the power control is not performed in the discovery resource allocated to the subframe 1207. FIG. 11 is different from FIG. 12 in that the power control is performed in the subframe 1107 because the position of the discovery resource, in which the discovery signal is transmitted, is not considered.

When the discovery signal is transmitted in the center of the band in the subframe scheduled with the PUCCH signal as described above, the power control in the corresponding subframe may not be performed. Therefore, since the transmission power of the discovery signal is not reduced according to the result of the power control, the discovery performance of the discovery signal may be improved.

However, although the discovery resource positioned in the central portion of the band is denoted by a reference numeral 1221, this is only an example, and the size of the discovery resource positioned in the central portion may be adjusted. Thus, the size of the discovery resource region 1213 for performing the power control may be determined according to the size of the discovery resource positioned in the central portion. This may be experimentally predetermined in consideration of the influence of interference on the base station according to the position of the discovery resource. Control information (or a control parameter) reflecting the corresponding experiment result according to the same may be provided to the user equipments in advance, and the user equipments may determine the size of the discovery resource region for performing the power control according to the control information. Alternatively, the base station may directly inform the user equipment of information on the size of the discovery resource region according to the experimental result value through a separate signaling.

Figure 13:
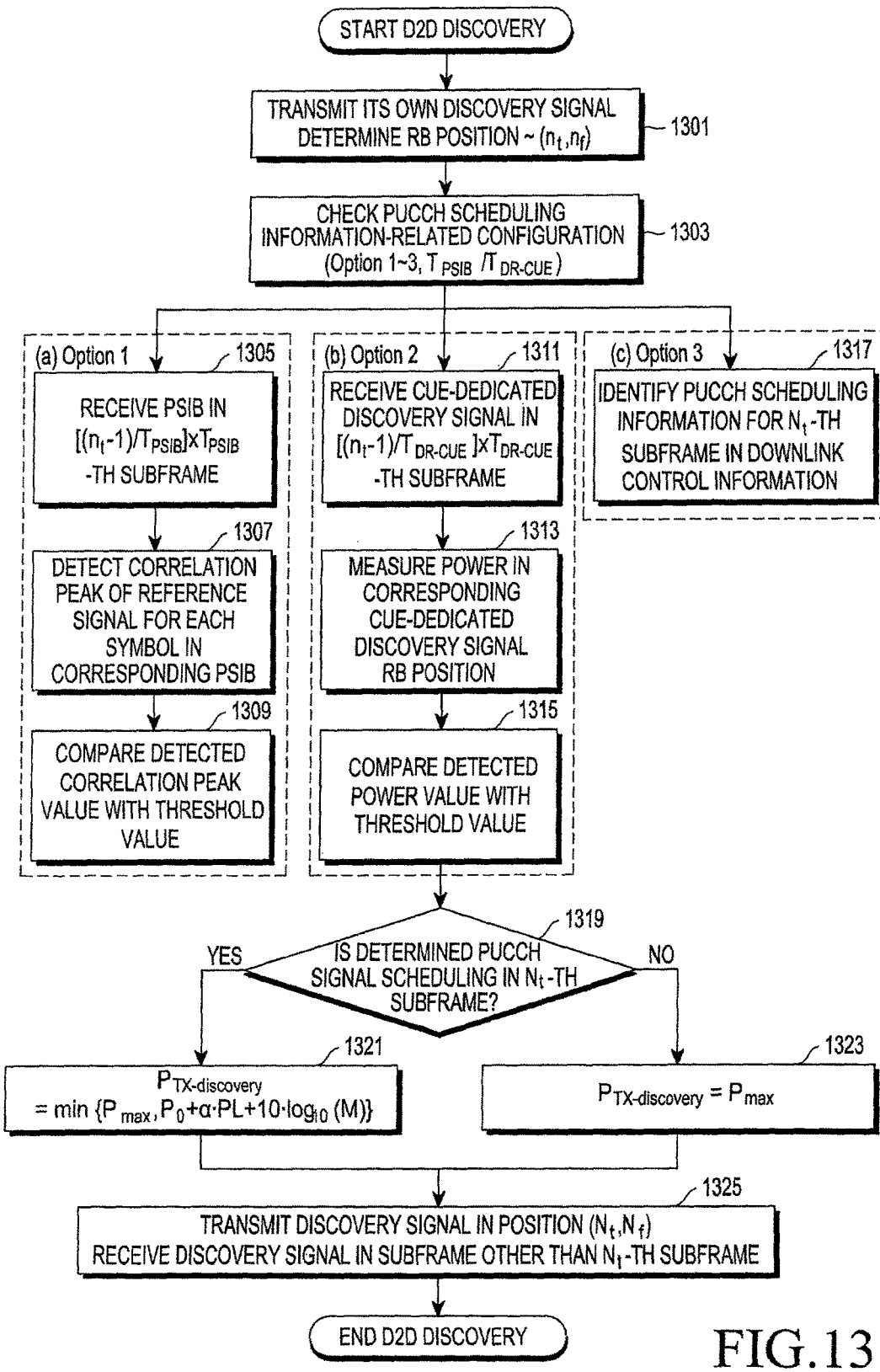
FIG. 13 is a view to explain the operation of a DUE, according to embodiments of the present disclosure.

FIG. 13 is a view to explain the operation of the DUE, according to embodiments of the present disclosure.

In operation 1301, the DUE determines the position ($n_t$, $n_f$) of the RB for transmitting its own discovery signal for the user equipment discovery in the D2D communication. At this time, a predetermined rule for the discovery resource selection may be applied to the position of the RB. Here, if the entire discovery resources are allocated with $N_T$ subframes and $N_F$ frequency axis RBs, $n_t$ ($0 \leq n_t < N_T$) and $n_f$ ($0 \leq n_f < N_F$) denote a subframe index and a frequency axis RB index of the selected discovery resource, respectively.

In operation 1303, the DUE checks configuration information related to the discovery channel, which is transmitted by the base station, in order to thereby identify a channel option value that is applied to the actual discovery channel among the structures of the discovery channel and the allocation period of the PSI RB or the CUE-dedicated discovery resource ($T_{PSI\ RB}$ or $T_{DR\text{-}CUE}$, respectively). The discovery channel-related configuration information may contain PSI transmission-related information, which is the information about the methods for transmitting the PUCCH scheduling information. Here, the PSI transmission-related information is illustrated to contain Method 1 based on the reference signal, Method 2 based on the user equipment-dedicated discovery signal, and Method 3 based on the downlink control information of the base station, which have been described above.

After checking the configuration information in operation 1303, the user equipment may perform the operation according to each method in order to thereby obtain the PSI. The user equipment performs operation 1305 and subsequent operations thereof in the case of Method 1, and performs operation 1311 and subsequent operations thereof in the case of Method 2. The user equipment performs operation 1317 and subsequent operations thereof in the case of Method 3. The detail operation is as follows.

In the case of Method 1, the DUEs that transmit the discovery signals in the $n_t$-th subframe receives the PSI RB in the $\lfloor(n_t-1)/T_{PSI\ RB}\rfloor \times T_{PSI\ RB}$-th subframe to which the PSI with respect to the $n_t$-th subframe is allocated in operation 1305, and detects correlation peak values of the discovery signals for each OFDM symbol index contained in the received PSI RB in operation 1307. The DUE compares the correlation peak value for each symbol with a predetermined threshold value in operation 1309, and if the correlation peak value for each symbol is greater than the predetermined threshold value, may determine that the scheduling of the PUCCH signal has been performed with respect to the $n_t$-th subframe.

In the case of Method 2, the DUE receives the CUE-dedicated discovery signal that is allocated to the $\lfloor(n_t-1)/T_{DR\text{-}CUE}\rfloor \times T_{DR\text{-}CUE}$-th frame in operation 1311. The DUE measures the power in the RB position of the corresponding CUE-dedicated discovery signal in operation 1313, and compares the measured power value with a predetermined threshold value in operation 1315. If the measured power value is greater than the predetermined threshold value, the DUE determines that the PUCCH signal has been allocated to the $n_r$-th subframe.

In the case of Method 3, the DUE receives system information that is contained in a system information block (SIB) transmitted by the base station in operation 1317, and identifies the PSI of the $n_r$-th subframe by directly obtaining the PSI contained in the system information.

As described above, the DUE identifies the PSI of the $n_r$-th subframe through each method, and determines whether or not the PUCCH signal has been allocated to the $n_r$-th subframe that the DUE selected in operation 1319.

If the PUCCH signal has not been allocated to the $n_r$-th subframe, the DUE proceeds to operation 1323 in order to thereby configure its own discovery signal transmission power ($P_{Tx\text{-}discovery}$) to be a maximum value ($P_{max}$)). If the PUCCH signal has been scheduled to the $n_r$-th subframe, the DUE proceeds to operation 1321 in order to thereby configure its own discovery signal transmission power according to Equation 1 below.

$$P_{Tx\text{-}discovery} = \min\{P_{max}, P_0 + \alpha \cdot PL + 10 \cdot \log 10(M)\} \quad \text{[Equation 1]}$$

Here, P0 denotes a semi-static base power level.

In addition, $\alpha$ ($0 \le \alpha \le 1$) denotes a path-loss compensation factor, which is a system parameter determined by the base station.

PL refers to a path-loss value estimated from the downlink reception power.

In addition, M refers to the number of RBs that are allocated to the user equipment.

Thereafter, in operation 1325, the user equipment transmits its own discovery signal in the $n_r$-th subframe with a power that is configured in operation 1321 or in operation 1323, and receives discovery signals of other user equipments in the remaining subframes except for the $n_r$-th subframe.

Figure 14A:
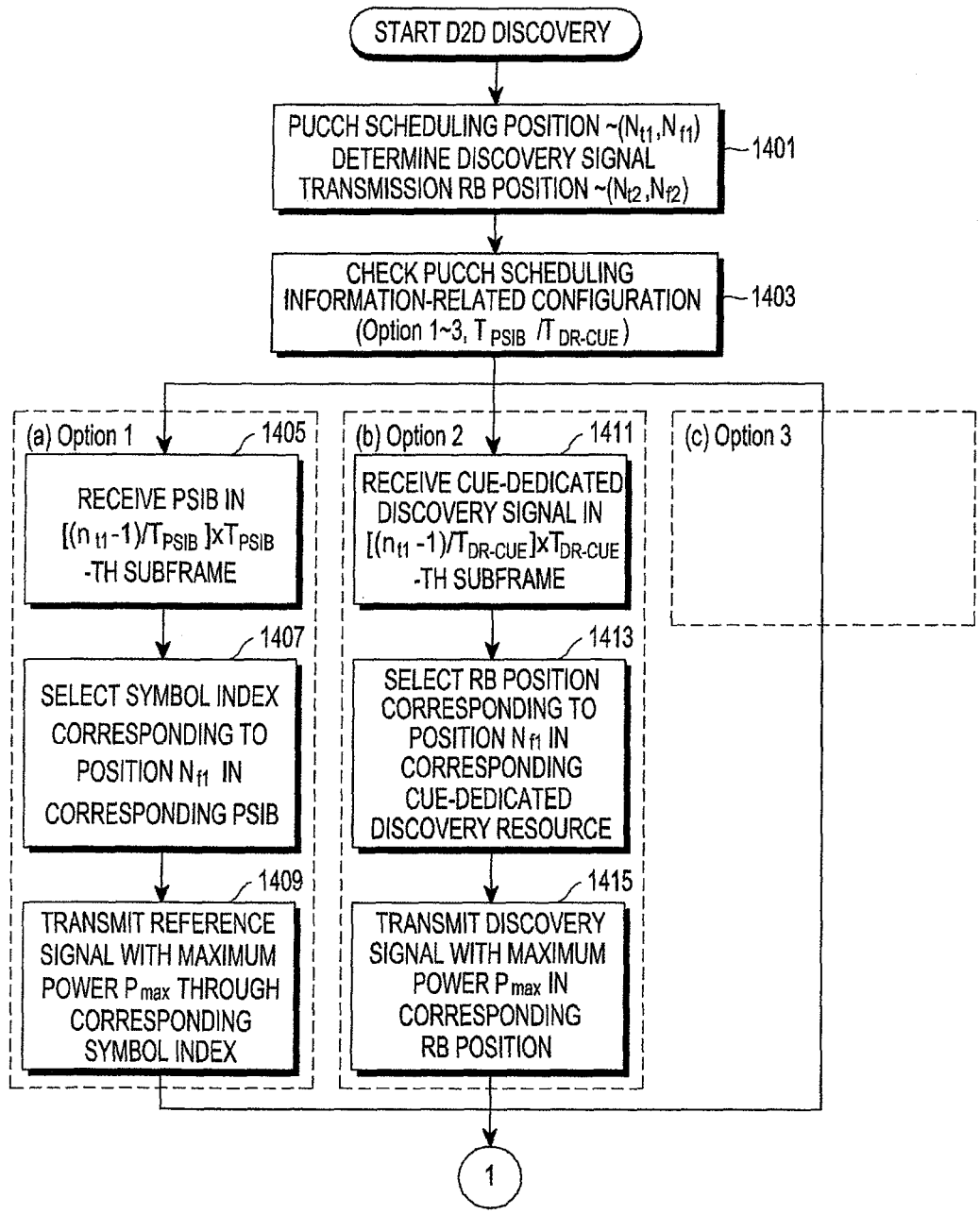
FIGS. 14a and 14b are views to explain the operation of a CUE, according to embodiments of the present disclosure.
Figure 14B:
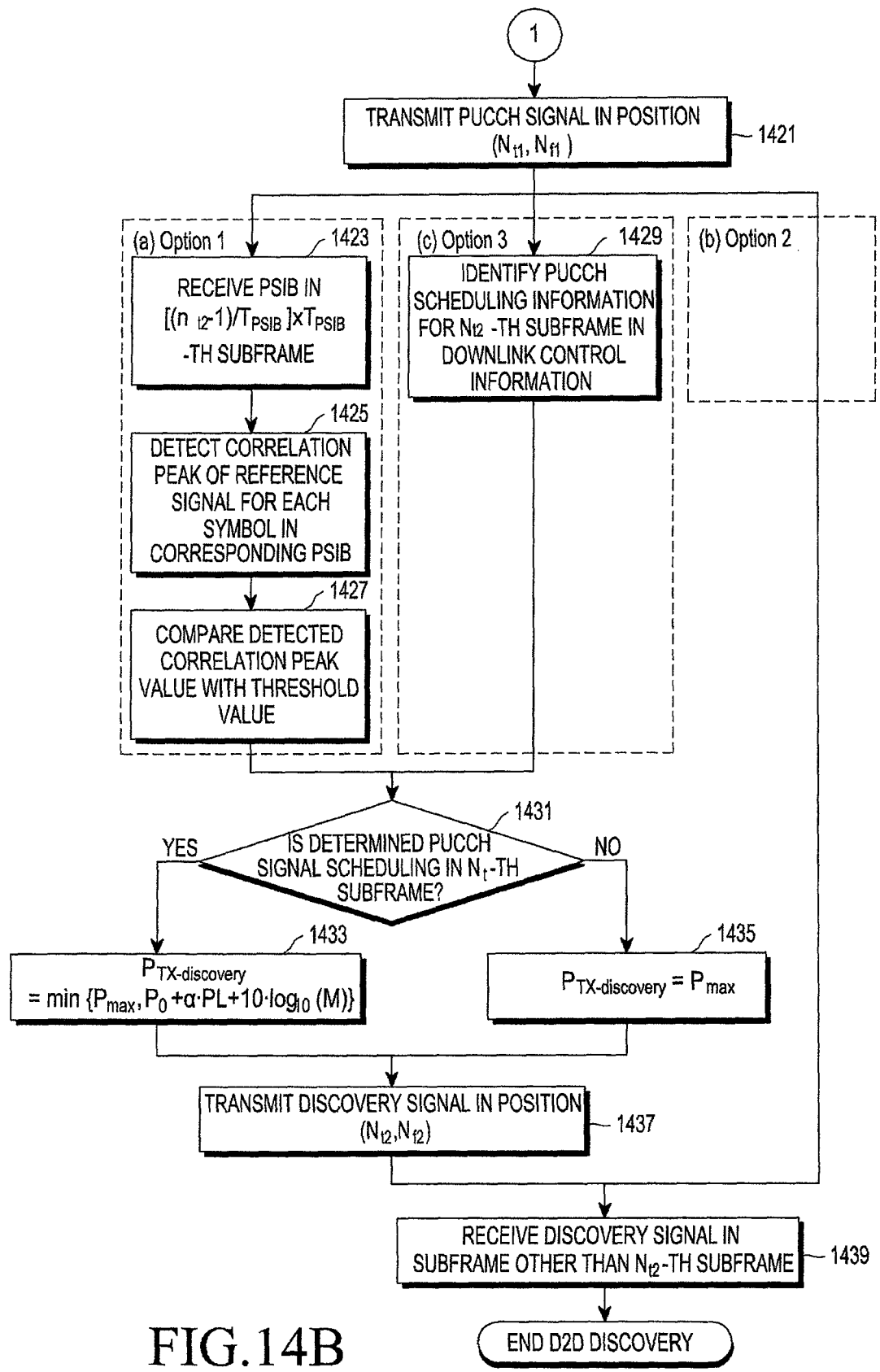

FIGS. 14a and 14b are views to explain the operation of the CUE, according to embodiments of the present disclosure.

The CUE was previously defined as a user equipment that is scheduled with the PUCCH signal by the base station. Therefore, in operation 1401, it is assumed that the CUE (hereinafter, referred to as a "user equipment" in the description of FIGS. 14a and 14b) has been scheduled with the corresponding PUCCH signal in a predetermined RB position ($n_{t1}, n_n$) by the base station. In addition, the CUE selects the discovery resource to be used for the user equipment discovery for D2D communication. At this time, the user equipment may determine the RB position ($n_{t1}, n_n$) for transmitting its own discovery signal among overall discovery signal resources according to a predetermined rule for selecting the discovery resource.

In the embodiments of the present disclosure, the CUE is to transfer the scheduling information of its own PUCCH signal to nearby user equipments in order to minimize the attenuation of the reception power of its own PUCCH signal, which is scheduled by the base station, in the base station because of the interference of the discovery signals from other user equipments. To this end, the CUE should obtain information on the method for transmitting the discovery signal from the configuration information contained in the downlink control signal transmitted by the base station.

That is, in operation 1403, the CUE receives the PSI transmission-related information for Methods 1 to 3 described above from configuration information transmitted by the base station. In addition, the CUE checks the allocation period of the PSI RB or the allocation period of the CUE-dedicated discovery resource ($p_{PSI\_RB}$ or $T_{DR\text{-}CUE}$, respectively) contained in the configuration information, and transmits its own PSI according to the operation corresponding to each method contained in the received PSI transmission-related information. The user equipment performs operation 1405 and subsequent operations thereof in the case of Method 1, and performs operation 1411 and subsequent operations thereof in the case of Method 2. The user equipment performs operation 1317 and subsequent operations thereof in the case of Method 3. The detail operation is as follows.

In the case of Method 1, the CUE receives the PSI RB that is allocated to the $\lfloor(n_{t1}-1)/T_{PSI\_RB}\rfloor \times T_{PSI\_RB}$-th subframe that is the RB position in which the PSI for the $n_{t1}$-th subframe is transmitted in operation 1405, and selects the index of the OFDM symbol corresponding to its own PUCCH RB position $n_{f1}$ on the frequency axis in the received PSI RB in operation 1407. Then, the CUE transmits the discovery signal with a maximum power ($P_{max}$) through the OFDM symbol corresponding to the selected index in operation 1409.

In the case of Method 2, the CUE receives the CUE-dedicated discovery resource region in the $\lfloor(n_{t1}-1)/T_{DR\text{-}CUE}\rfloor \times T_{DR\text{-}CUE}$-th subframe that is the position in which the user equipment, which transmits the PUCCH signal in the $n_{t1}$-th subframe, transmits its own discovery signal in operation 1411, and selects the RB position corresponding to the position $n_{f1}$ in the corresponding CUE-dedicated discovery resource in operation 1413. Then, the CUE transmits the discovery signal with a maximum power through the corresponding RB in operation 1415.

Unlike Methods 1 and 2, the base station directly transfers the PSI of the CUE to the user equipments in Method 3, so the CUE does not perform a separate operation for transmitting the PSI. Therefore, Method 3 is illustrated by only a dotted line in FIG. 14. This may be compared with FIG. 13 in which the DUE performs the operation of obtaining the scheduling information in method 3. Accordingly, the CUE may transmit the PSI according to the methods described above.

Afterwards, in operation 1421, the CUE transmits the PUCCH signal in the RB position ($n_{t1}, n_{f1}$) that is allocated by the base station.

Meanwhile, the CUE performs the transmission and reception operation of the discovery signal in the remaining discovery channels except for the RB position ($n_{t1}, n_{f1}$) where the PUCCH signal is transmitted. In the case of Method 1 or 3, the CUE selects the RB position ($n_{t2}, n_{f2}$) for transmitting its own discovery signal in the same manner as the operation of the DUE, and determines the transmission power according to whether or not the PUCCH signal is scheduled in the subframe position containing the selected RB position in order to thereby transmit the discovery signal. The CUE receives the discovery signals of other user equipments in the remaining subframes except for the subframe in which the discovery signal is transmitted. Meanwhile, in the case of Method 2, since the CUE transmits its own discovery signal through the CUE-dedicated discovery resource, the CUE performs only the operation of receiving the discovery signals of other user equipments without transmitting a separate discovery signal. Accordingly, this is illustrated by a dotted line in FIG. 14. This operation is illustrated in operation 1423 to operation 1439 in FIG. 14, which is the same as the description of operation 1305 and subsequent operations thereof in FIG. 13.

In the case of Method 1, the CUE receives the PSI RB that is allocated to the $\lfloor(n_{t2}-1)/T_{PSI\_RB}\rfloor \times T_{PSI\_RB}$-th subframe in operation 1423, and detects correlation peak values of the discovery signals for each OFDM symbol index contained in the received PSI RB in operation 1425. In operation 1427, the CUE compares the correlation peak value for each symbol with a predetermined threshold value in operation 1427, and if the correlation peak value for each symbol is greater than the predetermined threshold value, determines that the scheduling of the PUCCH signal has been performed with respect to the $n_{t2}$-th subframe.

In the case of Method 3, the DUE receives system information that is contained in a system information block (SIB) transmitted by the base station in operation 1429, and identifies the PSI of the $n_{t2}$-th subframe by directly obtaining the PSI contained in the system information.

As described above, the CUE identifies the PSI of the $n_{t2}$-th subframe through Method 1 or 3, and determines whether or not the PUCCH signal has been allocated to the $n_{t2}$-th subframe that the CUE selected in operation 1431.

If the PUCCH signal has not been allocated to the $n_{t2}$th subframe, the CUE proceeds to operation 1435 in order to thereby configure its own discovery signal transmission power $P_{Tx\text{-}discovery}$ to be a maximum value $P_{max}$. If the PUCCH signal has been scheduled to the $n_{t2}$-th subframe, the CUE proceeds to operation 1433 in order to thereby configure its own discovery signal transmission power according to Equation 1 described above.

Thereafter, in operation 1437, the CUE transmits its own discovery signal in the $n_{t2}$-th subframe with a power that is configured in operation 1433 or in operation 1435, and proceeds to operation 1439 in order to thereby receive discovery signals of other user equipments in the remaining subframes except for the $n_{t2}$-th subframe. Here, operation 1439 may be applied to Method 2 as well.

Hereinafter, a comparison result between the method described in the embodiment of the present disclosure and the conventional method will be described. This is a comparison result of the CCDF (Complementary Cumulative Distribution Function) distribution with respect to the reception SINR in the base station.

Figure 15:
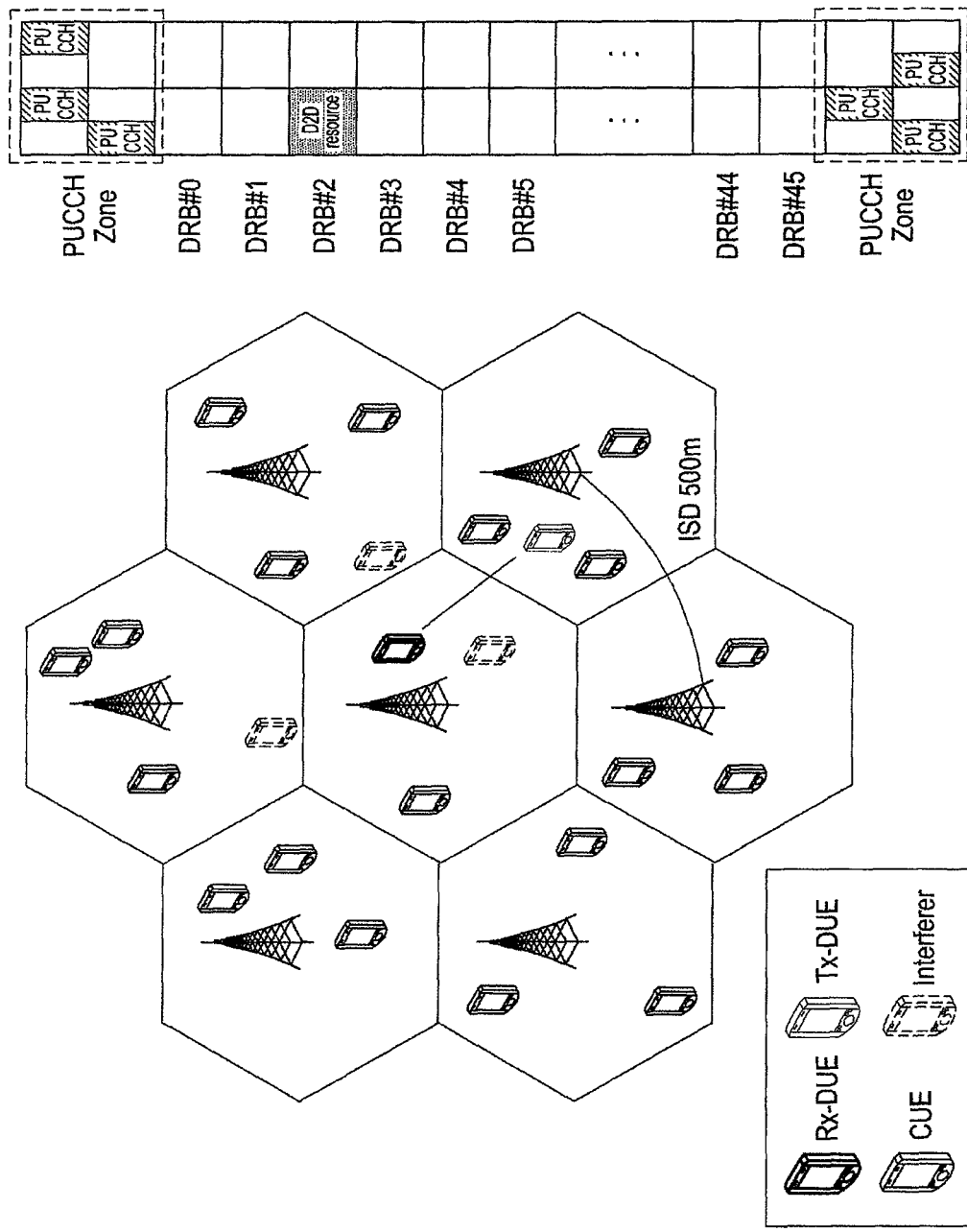
FIG. 15 is a view illustrating the cell environment, disposition of user equipments, and a resource allocating method, which are applied to the simulation for evaluating the performance, according to the embodiment of the present disclosure.

FIG. 15 is a view illustrating the cell environment, disposition of user equipments, and a resource allocating method, which are applied to the simulation for evaluating the performance, according to the embodiment of the present disclosure.

As shown in FIG. 15, seven adjacent cells in the form of a regular hexagon are considered to simulate the experiment for evaluating the performance. The cell radius may be about 288 m when the distance between the base stations is 500 m, and the cells are divided into three sectors based on the base station located in the center of the cells. The reference time between the base stations is synchronized to be the same on the assumption of synchronous time.

FIG. 15 assumes a wrap-around environment in which the transmission (Tx) DUEs for transmitting the discovery signals are randomly disposed in the whole cell area and the reception (Rx) DUEs for receiving the discovery signals are randomly disposed in the cell.

150 CUEs and 150 DUEs are randomly disposed in each sector to be uniformly distributed. 25 CUEs for transmitting the PUCCH signal and the discovery signal are configured in each sector, and 125 DUEs for transmitting only the discovery signal are configured in each sector. The CUE and the DUE transmit the discovery signals by using one RB that is randomly allocated among the resources other than the PUCCH region in the corresponding subframe, respectively.

Meanwhile, Table 1 below shows main parameters applied to the simulation. The simulation parameters in Table 1 are based on the decision of 3GPP TSG RAN1 #73 standardization meeting and the LTE system standard.

TABLE 1

| Parameter | Value |
| --- | --- |
| The number of UEs | 150 per sector |
| The number of Active UEs | 25 per sector |
| Bandwidth | 10 MHz |
| Carrier frequency | 2 GHz |
| FFT size | 1024 |
| CP size | 72/80 samples (Normal CP) |
| Path-loss model (UE-UE) | WINNER + B1 LOS/NLOS |
| Path-loss model (UE-eNB) | ITU-R Uma |
| Channel model | Extended Typical Urban |
| Inter-sight distance | 500 m |
| Power control | Open-loop power control (full compensation of pathloss, $\alpha = 1$) |
| Noise figure | 9 dB |
| Max. Tx power | 23 dBm |
| Shadow fading | Standard deviation: 7 dB |
| Discovery resource size | 44 RBs × 64 subframes |
| PUCCH zone size | 6 RBs × 64 subframes |

Figure 16:
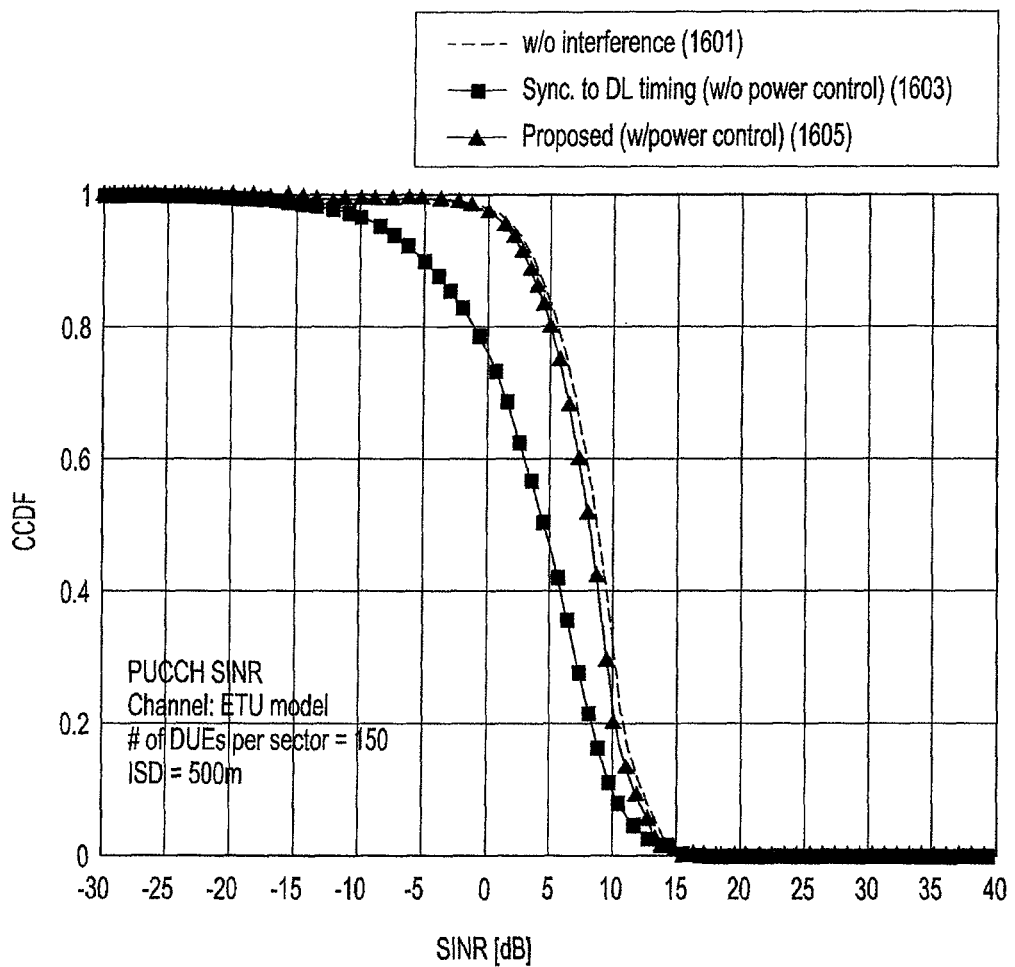
FIG. 16 is a view to compare the result of the conventional method with the result of the method according to the embodiment of the present disclosure in relation to the reception SINR distribution with respect to the PUCCH signal of the base station.

FIG. 16 is a view to compare the result of the conventional method with the result of the method according to the embodiment of the present disclosure in relation to the reception SINR distribution with respect to the PUCCH signal of the base station.

Referring to FIG. 16, in the conventional method, if the power control is not performed with respect to the discovery signal in the subframe position that is scheduled with the PUCCH signal, the PUCCH reception SINR of the base station significantly deteriorates (1603). On the contrary, according to the embodiment of the present disclosure, since the power control of the discovery signal is performed in the subframe position that is scheduled with the PUCCH signal, the interference with the base station may be effectively eliminated in order to thereby obtain the performance equal to the ideal performance of non-interference (1605). A result value 1605 of the embodiment of the present disclosure showed an improvement of 18.7% in the performance compared to the conventional method (1603) on the assumption that an approximate decoding threshold value is 0 dB.

Figure 17:
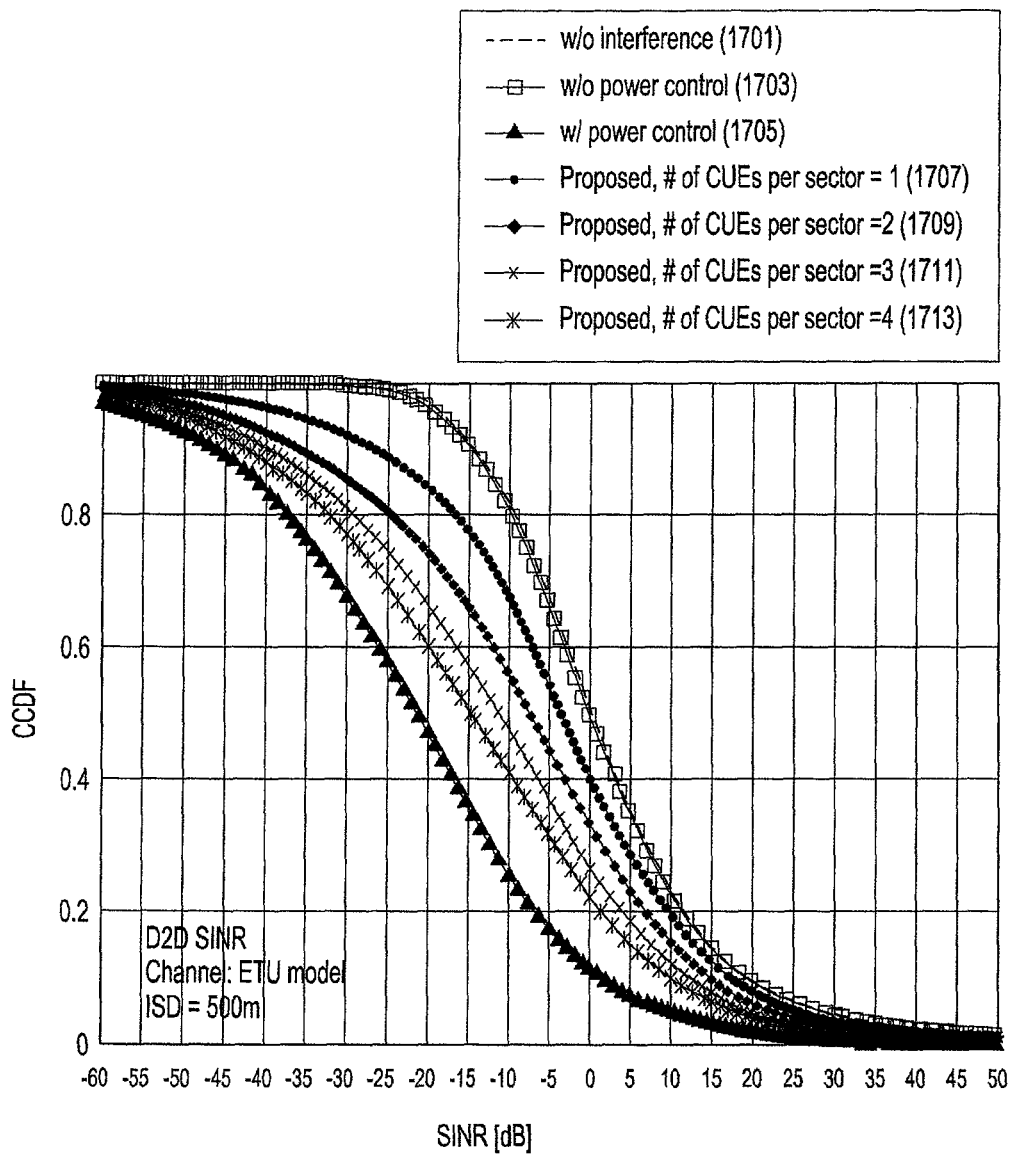
FIG. 17 is a view to compare the result of the conventional method with the result of the method according to the embodiment of the present disclosure in relation to the reception SINR distribution with respect to the discovery signal of the user equipment.

FIG. 17 is a view to compare the result of the conventional method with the result of the method according to the embodiment of the present disclosure in relation to the reception SINR distribution with respect to the discovery signal of the user equipment.

Referring to FIG. 17, if the power control is executed with respect to the discovery signal, the transmission power is lowered so that the reception SINR of discovery signal deteriorates. In the method according to the embodiment of the present disclosure, since the power control is only made in the subframe position that is scheduled with the PUCCH signal, a relatively excellent SINR distribution may be obtained in the case of a small number of CUEs for each sector compared to the case where the power control is made with respect to all of the user equipments.

Meanwhile, the reference numerals 1707, 1709, 1711, and 1713 denote the result values for one, two, three, and four CUEs for each sector, respectively. As the number of CUEs increases, the frequency of performing the power control for the discovery signal increases so that the SINR distribution deteriorates, which may be performance degradation for the protection of the legacy system.

Figure 18:
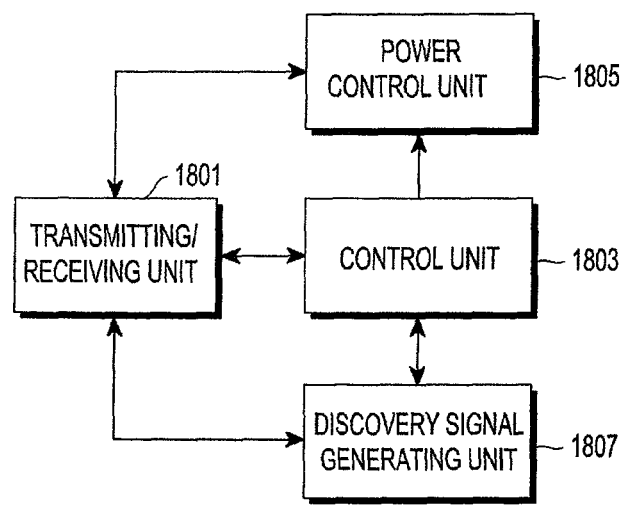
FIG. 18 is a view to explain the configuration of a user equipment device, according to the embodiment of the present disclosure.

FIG. 18 is a view to explain the configuration of a user equipment device, according to the embodiment of the present disclosure.

The user equipment device, according to the embodiment of the present disclosure, may perform both the D2D communication and the cellular communication, and may perform the operation described above according to the embodiments of the present disclosure. Therefore, the user equipment device that is scheduled with the PUCCH signal in the discovery channel becomes the CUE, and the user equipment device that is not scheduled with the PUCCH signal in the discovery channel becomes the DUE. For reference, both the DUE and the CUE can transmit and receive the discovery signals.

The transmitting/receiving unit 1801 performs the transmission and reception of signals with the base station and other user equipments. In particular, the transmitting/receiving unit 1801 receives scheduling information for the PUCCH signal from the base station. In addition, the transmitting/receiving unit 1801 transmits the discovery signal and the PSI proposed in the present disclosure.

The control unit 1803 controls functional blocks in order to perform the overall operations in relation to the embodiments of the present disclosure.

The power control unit 1805 performs the power control with respect to the discovery signal according to the aforementioned embodiments of the present disclosure. More specifically, the power control unit performs the power control with respect to the discovery signal that is transmitted in the subframe that is scheduled with the PUCCH signal according to the PSI, and does not perform the power control with respect to the discovery signal that is transmitted in the subframe that is not scheduled with the PUCCH signal. In addition, the power control unit does not perform the power control with respect to the discovery signal that is transmitted in the first subframe of the discovery channel. In addition, if the discovery resource, in which the discovery signal is transmitted in the subframe that is scheduled with the PUCCH signal, is within a predetermined range from the center of the entire discovery channel, the power control unit does not perform the power control.

The discovery signal generating unit 1807 generates the discovery signal and the PSI, according to embodiments of the present disclosure, and transmits the same to other user equipments. The methods for transmitting the PSI have been described in detail above, so the description thereof will be omitted here.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. A method for supporting device-to-device communication by a user equipment having a cellular communication function, the method comprising:
   receiving, from a base station, a schedule for an uplink control signal;
   generating uplink scheduling information related to a subframe in which a transmission of the uplink control signal is scheduled; and
   transmitting the uplink scheduling information through one or more uplink scheduling resource blocks positioned in a central portion of a frequency band allocated to a discovery channel for device-to-device communication, based on mapping relations between a position of resource blocks in which a transmission of the uplink control signal is scheduled and the one or more uplink scheduling resource blocks.

2. The method according to claim 1, wherein the one or more uplink scheduling resource blocks are mapped to a specific resource through which the uplink control signal is transmitted.

3. The method according to claim 2, wherein one uplink scheduling resource block is mapped with two or more resource blocks in the subframe in which a transmission of the uplink control signal is scheduled.

4. The method according to claim 1, wherein the one or more uplink scheduling resource blocks are determined based on a scheduling period of the uplink control signal.

5. The method according to claim 1, wherein the uplink scheduling information comprises a reference signal indicating a specific position of one or more resource blocks in the subframe in which a transmission of the uplink control signal is scheduled.

6. The method according to claim 5, wherein the reference signal is mapped to a orthogonal frequency division multiplex (OFDM) symbol corresponding a position of one or more resource blocks in the subframe in which a transmission of the uplink control signal is scheduled, from among a plurality of OFDM symbols included in the one or more uplink scheduling resource blocks.

7. The method according to claim 1, wherein the uplink scheduling information is transmitted through the one or more uplink scheduling resource blocks in a subframe just before the subframe in which a transmission of the uplink control signal is scheduled.

8. The method according to claim 1, wherein the uplink scheduling information comprises position information indicating a specific position of one or more resource blocks through which the uplink control signal is transmitted.

9. A method for transmitting a discovery signal by a user equipment having a device-to-device communication function, the method comprising:
   receiving, from a cellular user equipment, uplink scheduling information relating to a subframe in which a transmission of an uplink control signal for the cellular user equipment is scheduled, through one or more uplink scheduling resource blocks positioned in a central portion of a frequency band allocated to a discovery channel for device-to-device communication;
   performing power control for the discovery signal that is transmitted in the subframe in which a transmission of the uplink control signal is scheduled, according to the uplink scheduling information; and
   transmitting the power controlled discovery signal in the subframe in which a transmission of the uplink control signal is scheduled,
   wherein the discovery signal is transmitted without power control in remaining subframe in which a transmission of a uplink control signal for at least one cellular user equipment has not been scheduled, and
   wherein the uplink scheduling information is received based on mapping relations between a position of resource blocks in which a transmission of the uplink control signal is scheduled and the one or more uplink scheduling resource blocks.

10. The method according to claim 9, wherein the discovery signal is transmitted with power control in a first subframe of the discovery channel.

11. The method according to claim 9, wherein, the discovery signal is transmitted without power control in the subframe in which a transmission of the uplink control signal is scheduled, when a discovery resource in which the discovery signal is transmitted, is within a predetermined range from a central portion of the discovery channel.

12. A user equipment device having a cellular communication function, for supporting device-to-device communication, the user equipment device comprising:
a transceiver configured to receive, from a base station, a schedule for an uplink control signal; and
a processor configured to:
generate uplink scheduling information related to a subframe in which a transmission of the uplink control signal is scheduled; and
control the transceiver to transmit the uplink scheduling information through one or more uplink scheduling resource blocks positioned in a central of a frequency band allocated to a discovery channel for device-to-device communication, based on mapping relations between a position of resource blocks in which a transmission of the uplink control signal is scheduled and the one or more uplink scheduling resource blocks.

13. The user equipment device according to claim 12, wherein the the one or more uplink scheduling resource blocks are mapped to a specific resource through which the uplink control signal is transmitted.

14. The user equipment device according to claim 13, wherein one uplink scheduling resource block is mapped with two or more resource blocks in the subframe in which a transmission of the uplink control signal is scheduled.

15. The user equipment device according to claim 12, wherein the one or more uplink scheduling resource blocks are determined based on a scheduling period of the uplink control signal.

16. The user equipment device according to claim 12, wherein the uplink scheduling information comprises a reference signal indicating a specific position of one or more resource blocks in the subframe in which a transmission of the uplink control signal is scheduled.

17. The user equipment device according to claim 16, wherein the reference signal is mapped to a orthogonal frequency division multiplex (OFDM) symbol corresponding a position of one or more resource blocks in the subframe in which a transmission of the uplink control signal is scheduled, from among a plurality of OFDM symbols included in the one or more uplink scheduling resource blocks.

18. The user equipment device according to claim 12, wherein the uplink scheduling information is transmitted through the one or more uplink scheduling resource blocks in a subframe just before the subframe in which a transmission of the uplink control signal is to be scheduled.

19. The user equipment device according to claim 12, wherein the uplink scheduling information comprises position information indicating a specific position of one or more resource blocks through which the uplink control signal is transmitted.

20. A user equipment device having a device-to-device communication function, for transmitting a discovery signal, the user equipment device comprising:
a transceiver configured to receive, from a cellular user equipment, uplink scheduling information relating to a subframe in which a transmission of an uplink control signal for the cellular user equipment is scheduled, through one or more uplink scheduling resource blocks positioned in a central portion of a frequency band allocated to a discovery channel for device-to-device communication; and
a processor configured to:
perform power control for the discovery signal that is transmitted in the subframe in which a transmission of the uplink control signal is scheduled, according to the uplink scheduling information, and
control the transceiver to transmit the power controlled discovery signal in the subframe in which a transmission of the uplink control signal is scheduled,
wherein the discovery signal is transmitted without power control in remaining subframe in which a transmission of a uplink control signal for at least one cellular user equipment has not been scheduled, and
wherein the uplink scheduling information is received based on mapping relations between a position of resource blocks in which a transmission of the uplink control signal is scheduled and the one or more uplink scheduling resource blocks.

21. The user equipment device according to claim 20, wherein the discovery signal is transmitted with power control in a first subframe of the discovery channel.

22. The user equipment device according to claim 20, wherein the discovery signal is transmitted without power control in the subframe in which a transmission of the uplink control signal is scheduled, when a discovery resource in which the discovery signal is transmitted, is within a predetermined range from a central portion of the discovery channel.

* * * * *